(12) United States Patent
Fang et al.

(10) Patent No.: US 12,245,304 B2
(45) Date of Patent: Mar. 4, 2025

(54) POWER SAVING MECHANISMS FOR MULTI-LINK COMMUNICATIONS

(71) Applicant: ZTE Corporation, Guangdong (CN)

(72) Inventors: Yonggang Fang, Guangdong (CN); Bo Sun, Guangdong (CN); Zhiqiang Han, Guangdong (CN)

(73) Assignee: ZTE Corporation, Shenzhen (CN)

( * ) Notice: Subject to any disclaimer, the term of this patent is extended or adjusted under 35 U.S.C. 154(b) by 323 days.

(21) Appl. No.: 17/572,316

(22) Filed: Jan. 10, 2022

(65) Prior Publication Data
US 2022/0132423 A1 Apr. 28, 2022

Related U.S. Application Data

(63) Continuation of application No. PCT/CN2020/071072, filed on Jan. 9, 2020.

(30) Foreign Application Priority Data

Jul. 10, 2019 (WO) ................ PCT/CN2019/095428

(51) Int. Cl.
*H04W 76/15* (2018.01)
*H04W 28/06* (2009.01)
(Continued)

(52) U.S. Cl.
CPC ........... *H04W 76/15* (2018.02); *H04W 28/06* (2013.01); *H04W 52/0229* (2013.01); *H04W 76/20* (2018.02); *H04W 84/12* (2013.01)

(58) Field of Classification Search
CPC . H04W 76/15; H04W 28/06; H04W 52/0229; H04W 76/20; H04W 48/12; H04W 84/12; H04W 88/08; Y02D 30/70
See application file for complete search history.

(56) References Cited

U.S. PATENT DOCUMENTS 8,326,372 B2   12/2012   Raissinia
8,850,204 B2   9/2014    Stacey et al.
(Continued)

FOREIGN PATENT DOCUMENTS

CN   1913445 A      2/2007
CN   101849425 A    9/2010
(Continued)

OTHER PUBLICATIONS

European Search Report for EP Patent Application No. 20836839.9, dated on Sep. 22, 2022, 11 pages.
(Continued)

*Primary Examiner* — Michael K Phillips
(74) *Attorney, Agent, or Firm* — Perkins Coie LLP

(57) ABSTRACT

Methods, systems, and devices related to related to digital wireless communication, and more specifically, to techniques related to the power saving mechanism for multi-link operation. In one exemplary aspect, a method for wireless communication includes transmitting a link wakeup indication message to a wireless device over a first link of multiple links between the network node and the wireless device. The link wakeup indication message may indicate a request to transition at least one link of the multiple links between an active state and a power saving state. The method may also include, responsive to transmitting the link wakeup indication message, obtaining, by the network node, a link wakeup notification message from the wireless device indicating that at least one link of the multiple links has transitioned between the active state and the power saving state.

18 Claims, 14 Drawing Sheets

(51) Int. Cl.
*H04W 52/02* (2009.01)
*H04W 76/20* (2018.01)
*H04W 84/12* (2009.01)

(56) References Cited

U.S. PATENT DOCUMENTS

| | | | |
|---|---|---|---|
| 9,348,400 | B2 | 5/2016 | Lejeune |
| 10,142,972 | B2 | 11/2018 | Merlin et al. |
| 11,357,046 | B2 | 6/2022 | Seo et al. |
| 11,665,264 | B2 | 5/2023 | Li et al. |
| 11,979,773 | B2 | 5/2024 | Jauh et al. |
| 2007/0055795 | A1 | 3/2007 | Seo et al. |
| 2009/0292935 | A1 | 11/2009 | Hallnor et al. |
| 2011/0235513 | A1 | 9/2011 | Ali |
| 2012/0120892 | A1 | 5/2012 | Freda et al. |
| 2012/0218947 | A1 | 8/2012 | Merlin et al. |
| 2014/0269474 | A1* | 9/2014 | Zhu ............. H04W 52/0229 370/311 |
| 2015/0098397 | A1 | 4/2015 | Damnjanovic et al. |
| 2016/0212625 | A1 | 7/2016 | Damnjanovic et al. |
| 2016/0316470 | A1 | 10/2016 | Wong et al. |
| 2017/0006542 | A1 | 1/2017 | Huang et al. |
| 2017/0064739 | A1 | 3/2017 | Hedayat et al. |
| 2017/0257888 | A1 | 9/2017 | Kneckt et al. |
| 2017/0273024 | A1* | 9/2017 | Xu ............. H04L 67/145 |
| 2018/0132176 | A1* | 5/2018 | Abraham ......... H04W 52/0235 |
| 2018/0176929 | A1 | 6/2018 | Ryu et al. |
| 2018/0176954 | A1 | 6/2018 | Singh et al. |
| 2018/0206190 | A1* | 7/2018 | Cherian ............. H04L 1/1621 |
| 2018/0206284 | A1 | 7/2018 | Zhou et al. |
| 2018/0376394 | A1 | 12/2018 | Hahn et al. |
| 2019/0082373 | A1 | 3/2019 | Patil et al. |
| 2019/0082463 | A1 | 3/2019 | Patil et al. |
| 2019/0116546 | A1 | 4/2019 | Kang et al. |
| 2019/0150214 | A1 | 5/2019 | Zhou et al. |
| 2019/0327607 | A1 | 10/2019 | Xiao et al. |
| 2019/0335454 | A1* | 10/2019 | Huang ............. H04W 72/542 |
| 2019/0364555 | A1 | 11/2019 | Huang et al. |
| 2020/0029324 | A1 | 1/2020 | Nezou et al. |
| 2020/0145921 | A1* | 5/2020 | Zhang ............. H04W 52/0235 |
| 2020/0305193 | A1 | 9/2020 | Kim et al. |
| 2020/0314749 | A1* | 10/2020 | Sarkis ............. H04L 5/0092 |
| 2020/0322889 | A1* | 10/2020 | Chitrakar ............. H04L 27/26 |
| 2020/0413340 | A1* | 12/2020 | Nam ............. H04W 76/20 |
| 2021/0007168 | A1* | 1/2021 | Asterjadhi ......... H04W 52/0216 |
| 2021/0227547 | A1 | 7/2021 | Chitrakar et al. |
| 2021/0243749 | A1 | 8/2021 | Hoang et al. |
| 2021/0259044 | A1* | 8/2021 | Islam ............. H04W 52/0229 |
| 2021/0345134 | A1 | 11/2021 | Ottersten et al. |
| 2021/0360522 | A1 | 11/2021 | Chitrakar et al. |
| 2022/0086098 | A1 | 3/2022 | Huang et al. |
| 2022/0182938 | A1* | 6/2022 | Ye ............. H04W 76/28 |
| 2023/0379999 | A1 | 11/2023 | Kim et al. |

FOREIGN PATENT DOCUMENTS

| | | |
|---|---|---|
| CN | 102271128 A | 12/2011 |
| CN | 103081421 A | 5/2013 |
| CN | 103222311 A | 7/2013 |
| CN | 103297481 A | 9/2013 |
| CN | 104104539 A | 10/2014 |
| CN | 105830360 A | 8/2016 |
| CN | 106375045 A | 2/2017 |
| CN | 107548569 A | 1/2018 |
| CN | 107852299 A | 3/2018 |
| CN | 104349405 B | 1/2019 |
| CN | 109587052 A | 4/2019 |
| CN | 107852299 B | 11/2020 |
| CN | 112188640 A | 1/2021 |
| JP | H09289684 A | 11/1997 |
| SG | 10201809503 R | 5/2020 |
| WO | 2017/030483 A1 | 2/2017 |
| WO | 2018/136516 A1 | 7/2018 |
| WO | 2018121347 A1 | 7/2018 |
| WO | 2019006085 A1 | 1/2019 |
| WO | 2019099268 A1 | 5/2019 |
| WO | 2019132607 A1 | 7/2019 |
| WO | 2020033381 A1 | 2/2020 |
| WO | 2021003700 A1 | 1/2021 |
| WO | 2021004079 A1 | 1/2021 |
| WO | 2021004142 A1 | 1/2021 |
| WO | 2021182902 A1 | 9/2021 |

OTHER PUBLICATIONS

Naribole et al., "Multi-link Channel Access Discussion," IEEE 802.11-19/1405r2, Oct. 31, 2019, 19 pages.
Fang et al., "ML CCA and Channel Access for non-STR Links," IEEE 802.11-2020/1221, Aug. 13, 2020, 17 pages.
European Search Report for EP Patent Application No. 20837346.4, dated on Sep. 26, 2022, 10 pages.
Cavalcanti et al., "Low latency service in 802.11be," IEEE 802.11-20/0418r0, Mar. 2020, 13 pages.
Das et al., "Priority Access Support for NS/EP Services," IEEE 802.11-20/0021-00, Jan. 11, 2020, 15 pages.
Fang et al., "Channel Access Category," IEEE 802.11-2020/0468, Mar. 16, 2020, 12 pages.
International Search Report and Written Opinion mailed on Apr. 8, 2020 for International Application No. PCT/CN2019/095428, filed on Jul. 10, 2019 (7 pages).
International Search Report and Written Opinion mailed on Apr. 8, 2020 for International Application No. PCT/CN2020/071072, filed on Jan. 9, 2020 (6 pages).
European Search Report for EP Patent Application No. 19936862.2, dated on Jun. 21, 2022, 9 pages.
International Search Report and Written Opinion for PCT/CN2020/078991, dated May 15, 2020, 10 pages.
Huawei et al., "Coexistence and channel access for NR-based unlicensed band operation," 3GPP TSG RAN WG1 NR Ad Hoc Meeting R1-1711467, Qingdao, China, Jun. 27-30, 2017, 5 pages.
International Search Report and Written Opinion for PCT/CN2020/088757, dated Jul. 17, 2020, 9 pages.
Mediatek Inc., "Dual Connectivity Uplink," 3GPP TSG-RAN2 #85 Meeting R2-140803, Prague, Czech Republic, Feb. 10-14, 2014, 2 pages.
Catt, "Multiple connections for transmission reliability," 3GPP TSG-RAN WG2 Meeting #93bis, R2-162567, Dubrovnik, Croatia, Apr. 11-15, 2016, 5 pages.
Nokia et al., "Multi-connectivity considerations for New Radio," 3GPP TSG-RAN WG2 Meeting #93bis, R2-162499, Dubrovnik, Croatia, Apr. 11-15, 2016, 3 pages.
International Search Report and Written Opinion for PCT/CN2020/106077, dated Dec. 10, 2020, 7 pages.
Co-Pending U.S. Appl. No. 17/647,569, Non-Final Office Action dated May 7, 2024, 25 pages.
Co-Pending EP Application No. 20924271.8, Extended European Search Report dated May 23, 2023, 13 pages.
Samsung "Multi-link Channel Access Follow-up", vol. 802.11 EHT; 802.11be, No. 4, EEE-SA Mentor, Piscataway, NJ USA, 21 pages, Nov. 11, 2019.
Broadcom, Inc. "MLO-Synch-Transmission", IEEE Draft; IEEE-SA Mentor, Piscataway, NJ USA, vol. 802.11 EHT; 802.11be, No. 1, 59 pages, Jan. 10, 2020.
Co-Pending U.S. Appl. No. 17/647,567, Non-Final Office Action dated Mar. 20, 2024, 19 pages.
Co-Pending U.S. Appl. No. 17/647,563, Non-Final Office Action dated Feb. 1, 2024, 26 pages.
Co-Pending U.S. Appl. No. 17/647,563, Final Office Action dated Apr. 8, 2024, 22 pages.
Chinese office action issued in co-pending Chinese Patent Application No. 201980098356.4, dated May 29, 2024, 31 pages. English translation included.
Chinese office action issued in CN Patent Application No. 202080050271.1, dated Sep. 23, 2024, 18 pages. English translation included.
European Communication under Rule 71(3) EPC issued in EP Patent Application No. 19936862.2, dated Oct. 8, 2024, 47 pages.

(56) References Cited

OTHER PUBLICATIONS

Chinese Notification to Complete Formalities of Registration issued in CN Patent Application No. 201980098356.4, dated Sep. 20, 2024, 5 pages. English translation included.

* cited by examiner

POWER SAVING MECHANISMS FOR MULTI-LINK COMMUNICATIONS

CROSS REFERENCE TO RELATED APPLICATIONS

This application is a continuation of International Patent Application No. PCT/CN2020/071072, filed on Jan. 9, 2020, which claims the benefit of priority under 35 U.S.C. § 119(a) and the Paris Convention of International Patent Application No. PCT/CN2019/095428, filed on Jul. 10, 2019, the contents of each of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

Wireless communication systems can include a network consisting of one or more access points (APs) that communicate with one or more wireless stations (STAs). An AP can transmit radio signals that are indicative of management information, control information, user data, etc., to one or more STAs. A STA may transmit radio signals to the AP in the same frequency channel using a technique such as time division duplexing (TDD), or in a different frequency using a technique such as frequency division duplexing (FDD).

Institute of Electrical and Electronics Engineers (IEEE) section 802.11 provides a specification for a wireless local area network (WLAN) over radio channels in license-exempt bands. The basic unit of a WLAN can include a basic service set (BSS). An infrastructure BSS may include the BSS with stations (i.e., non-AP stations), through associating with an access point to connect to the wired network or Internet. In an infrastructure BSS, both an access point and a station may share the same frequency channels via using a technique, such as Carrier Sensing Multiple Access with Collision Avoidance (CSMA/CA) technology, a kind of TDD, for multiple access and data transmission.

SUMMARY

This document discloses systems, devices and methods related to digital wireless communications, and more specifically, to techniques related to power saving mechanisms in utilizing multiple wireless links between a wireless station and one or multiple access points to transmit user data to reduce the access delay, improve transmission reliability and increase transmission throughput.

In one exemplary aspect, a method for wireless communication includes transmitting, by a network node, a link wakeup indication message to a wireless device over a first link of multiple links between the network node and the wireless device, the link wakeup indication message indicating a request to transition at least one link of the multiple links between an active state and a power saving state. The method also includes responsive to transmitting the link wakeup indication message, obtaining, by the network node, a link wakeup notification message from the wireless device indicating that at least one link of the multiple links has transitioned between the active state and the power saving state.

In another exemplary aspect, a method for wireless communication includes receiving, by a wireless device, a link wakeup indication message from a network node over a primary link of multiple links between the network node and the wireless device. The method also includes transitioning, by the wireless device, at least one link of the multiple links from a power saving state to an active state based on receiving the link wakeup indication message from the network node. The method also includes transmitting, by the wireless device, a link wakeup notification message to the network node indicating that the at least one link of the multiple links has been transitioned from the power saving state to the active state.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

Some embodiments may preferably implement the following solutions, written in a clause-format.

1. A solution for wireless communication, comprising: transmitting, by a network node, a link wakeup indication message to a wireless device over a first link of multiple links between the network node and the wireless device, the link wakeup indication message indicating a request to transition at least one link of the multiple links between an active state and a power saving state; and responsive to transmitting the link wakeup indication message, obtaining, by the network node, a link wakeup notification message from the wireless device indicating that at least one link of the multiple links has transitioned between the active state and the power saving state.

2. The solution of clause 1, further comprising: responsive to obtaining the link wakeup notification message from the wireless device, transmitting, by the network node, data to the wireless device over two or more of the multiple links between the network node and the wireless device.

3. The solution of clause 1, wherein the wireless device is configured to transition the at least one link of the multiple links from the active state to the power saving state based on detecting an expiry of an activation timer.

4. The solution of clause 1, wherein the multiple links include a primary link and at least one secondary link between the network node and the wireless device, and wherein the first link includes the primary link.

5. The solution of clause 1, further comprising: responsive to obtaining the link wakeup notification message from the wireless device, establishing, by the network node, a multi-link transmission opportunity for multilink data transmission between the network node and wireless device during the multi-link transmission opportunity.

6. The solution of clause 2, further comprising: obtaining, by the network node, a multi-link acknowledgement message from the wireless device indicating that the data has been successfully received from the wireless device over the multiple links.

7. The solution of any of clauses 1 or 4, wherein the link wakeup indication message is transmitted over the primary link, and wherein the link wakeup indication message is sent to the wireless device over both the primary link and/or the at least one link.

8. The solution of clause 1, wherein the network node includes a logical entity configured to control multi-link data transmission to a first set of radio stations internal to the network node and to a second set of radio stations external to the network node.

9. The solution of clause 1, wherein the network node includes a MAC layer management entity (MLME) configured to manage a configuration of the multiple links.

10. The solution of any of clauses 1 or 4, wherein the power saving state enables only the primary link, and the active state enables both the primary link and/or the at least one link of the multiple links.

11. The solution of clause 10, wherein the wireless device is configured to transition at least one link from the power saving state to the active state upon reception of the link wakeup indication message from the network node over the primary link.

12. The solution of clause 1, wherein the link wakeup indication message is included in an information element of a management frame.

13. The solution of clause 1, wherein the link wakeup indication message is included in a beacon frame.

14. The solution any of clauses 12 or 13, wherein the link wakeup indication message includes a multi-link indication field including a bitmap indicative of the multiple links between the network node and the wireless device and/or a bitmap for corresponding wireless devices to be activated on the associated wakeup link.

15. The solution of clause 14, wherein the wireless device is configured to transition from the power saving state to the active state based on determining that the bitmap of the multi-link indication field indicates that the multiple links between the network node and wireless device are to transition from the power saving state to the active state.

16. The solution of clause 13, wherein the link wakeup indication message is transmitted to the wireless device via a unicast frame, wherein a multi-link indication field of the unicast frame only includes a bit indicative of whether to transition one or more links of the wireless device between the power saving state and the active state.

17. The solution of clause 4, further comprising: receiving, by the network node, a primary link request message from the wireless device that identifies the first link to be included as the primary link and includes link configuration information; transmitting, by the network node, a primary link response message to the wireless device confirming the first link as the primary link; and/or receiving, by the network node, a primary link acknowledgment message indicating that the first link has been established as the primary link.

18. The solution of clause 17, wherein the primary link request message identifies that the primary link is to be transitioned from a previous link to the first link.

19. A solution for wireless communication, comprising: receiving, by a wireless device, a link wakeup indication message from a network node over a primary link of multiple links between the network node and the wireless device; transitioning, by the wireless device, at least one link of the multiple links from a power saving state to an active state based on receiving the link wakeup indication message from the network node; and transmitting, by the wireless device, a link wakeup notification message to the network node indicating that the at least one link of the multiple links has been transitioned from the power saving state to the active state.

20. The solution of clause 19, further comprising: responsive to transmitting the link wakeup notification message, receiving, by the wireless device, data from the network node over at least two of the multiple links between the network node and the wireless device.

21. The solution of clause 19, wherein transitioning from the power saving state to the active state includes: enabling, by the wireless device, the at least one link of the multiple links to receive data from the network node, wherein the power saving state enables only the primary link.

22. The solution of clause 19, wherein a multi-link transmission opportunity is established for multi-link transmissions between the network node and the wireless device during the multi-link transmission opportunity.

23. The solution of clause 20, further comprising: responsive to determining that the data has been received, transmitting, by the wireless device, a multi-link acknowledgement message to the network node indicating that the data has been successfully received from the network node over the multiple links.

24. The solution of clause 20, wherein the data transmitted by the network node is sent by a first set of radio stations internal to the network node and a second set of radio stations external to the network node, wherein the first set of radio stations and the second set of radio stations are controlled by a logical entity of the network node.

25. The solution of clause 19, wherein the link wakeup indication message is included in an information element of a management frame.

26. The solution of clause 19, wherein the link wakeup indication message is included in a beacon frame.

27. The solution any of clauses 25 or 26, wherein the link wakeup indication message incudes a multi-link indication field including a bitmap indicative of the multiple links between the network node and the wireless device.

28. The solution of clause 27, wherein the wireless device is configured to transition from the power saving state to the active state based on determining that the bitmap of the multi-link indication field indicates that the multiple links between the network node and wireless device are to transition from the power saving state to the active state.

29. The solution of clause 19, wherein the link wakeup indication message is transmitted to the wireless device via a unicast frame, wherein a multi-link indication field of the unicast frame includes a bit indicative of whether to transition the wireless device between the power saving state and the active state.

30. The solution of clause 19, further comprising: transmitting, by the wireless device, a primary link request message to the network node that identifies a first link to be included as the primary link and includes link configuration information; receiving, by the wireless device, a primary link response message from the network node confirming the first link as the primary link; and/or transmitting, by the wireless device, a primary link acknowledgment message to the network node indicating that the first link has been established as the primary link.

31. The solution of clause 30, wherein the primary link request message identifies that the primary link is to be transitioned from a previous link to the first link.

32. An apparatus for wireless communication comprising a processor that is configured to carry out the solution of any of solutions 1 to 31.

33. A non-transitory computer readable medium having code stored thereon, the code when executed by a processor, causing the processor to implement a solution recited in any of solutions 1 to 31.

The details of one or more implementations are set forth in the accompanying attachments, the drawings, and the description below. Other features will be apparent from the description and drawings, and from the claims.

DETAILED DESCRIPTION

Figure 1:
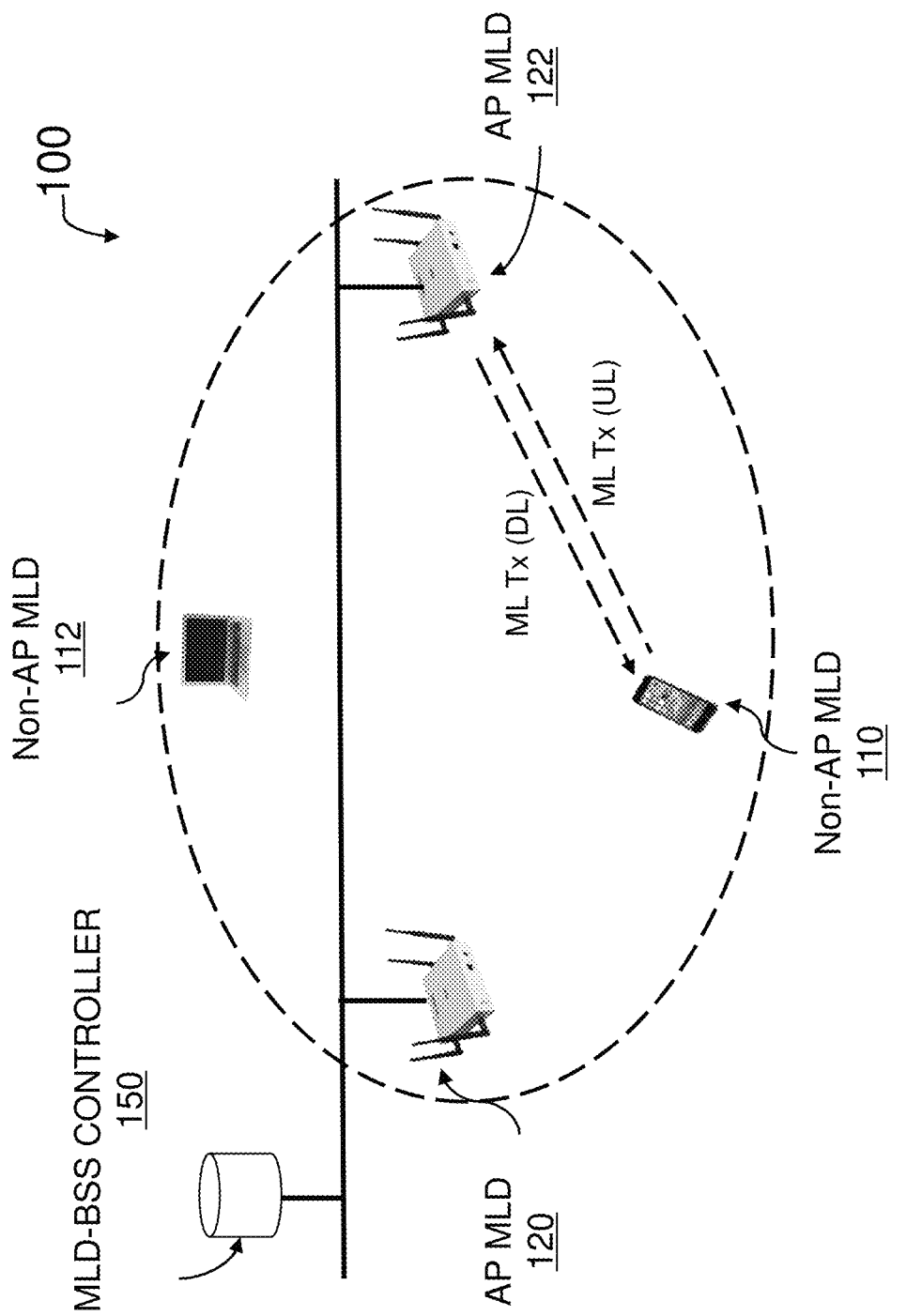
FIG. 1 illustrates an example infrastructure for a multi-link BSS.

Section headings are used in the present document only for ease of understanding and do not limit scope of the embodiments to the section in which they are described. Furthermore, while embodiments are described with reference to 5G examples, the disclosed techniques may be applied to wireless systems that use protocols other than 5G or 3GPP protocols.

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

Wireless local area communication is fast becoming a popular way to communicate with each other directly or via a network such as the internet. Multiple wireless devices (e.g., smartphones, tablets, etc.) may attempt to transmit and receive data on a shared communication spectrum in an environment (e.g., airport, homes, buildings, sports venues, etc.). Additionally, wireless devices (e.g., sensors, cameras, control units, etc.) are increasingly utilized in networks for various applications (e.g., factory automations, vehicle communications etc.).

In some cases, transmission of data is based on an air interface as specified by the Institute of Electrical and Electronics Engineers (IEEE), standard 802.11 series. In this specification, devices may share a transmission medium that include a certain set of rules. In IEEE 802.11, the basic service set (BSS) can include a building block of a Wireless Local Area Network (WLAN). Wireless stations (also referred to as simply "stations") associated in the radio coverage area may establish a BSS and provide the basic service of a WLAN.

IEEE 802.11 can generally specify wireless access protocols for operation on a license exempt and/or shared spectrum. A wireless station can operate on a channel in license exempt frequency band (e.g., 2.4 GHz or 5 GHz), or shared frequency band with other services (e.g., 6 GHz).

However, when operating on a license exempt or shared spectrum, transmission and reception of wireless messages may be unreliable due to interference from other stations located within the same coverage area, such as hidden node transmissions or "visible" nodes attempting to utilize the same shared communication medium for transmissions.

The device operated on the unlicensed frequency band generally utilizes a carrier sensing multiple access with collision avoidance (CSMA/CA) mechanism to control the multiple medium access based on the IEEE802.11 specification. Each station may implement a CSMA/CA function. Before access to the wireless medium, the station may sense the medium occupancy using CSMA/CA. If the station determines that the medium is busy, it may wait and re-attempt to sense the medium at a later time. If the station senses that the medium is idle, the station may wait for an inter frame space (IFS) and then enter the contention window (CW). In order to support multiple stations to access to the medium, each station may back-off for a random time before transmitting over the medium to reduce the collision and distribute the medium access evenly.

Existing CSMA/CA mechanisms specified in IEEE 802.11 may have a significant access delay in each transmission and an issue of medium utilization efficiency. For instance, when a large number of stations share the same medium and are going to transmit simultaneously, the CSMA/CA mechanism may cause the unreliable transmissions (e.g., more transmission packet loss, longer access delay, and larger jittering in an unstable radio environment).

In some cases, the current IEEE802.11 specification may only allow for one station to associate with one access point over one wireless link. A wireless link can include a wireless interface between multiple radio stations. In many cases, only allowing one station to associate with an access point over a link may increase a difficulty for the station to receive a reliable transmission when this wireless link is congested or interfered, either at the station side or the access point side. Accordingly, a wireless station and an access point may not be able to communicate with one other if the associated wireless link is busy.

Multi-link communication may include techniques that utilize multiple links that can reduce the access latency, improve transmission reliability, and increase transmission throughput in WLAN networks by implementing a mechanism to utilize and control the multi-link (ML) communications over multiple wireless channels.

FIG. 1 illustrates an example multi-link infrastructure BSS 100. The infrastructure may include multiple non-AP multi-link devices (MLDs) (e.g. non-AP MLD 110 and non-AP MLD 112). A non-AP MLD 110 may be within a communication range of a first AP MLD 120 and/or a second AP MLD 122, which can establish an infrastructure multi-link BSS (e.g., ML-BSS1 and ML-BSS2). AP MLD 120 and AP MLD 122 may be interconnected via a switch through a distribution system (DS) that can form a MLD-BSS 100 coordinated via a MLD-BSS controller 150.

In some embodiments, a non-AP MLD (e.g., non-AP MLD 110) with multiple radios can operate using multiple channels (or OFDMA channels) in the same frequency band or different bands to establish multi-link (ML) communication with an AP MLD (e.g. AP MLD 122). The non-AP MLD can associate with one or more AP MLDs in the MLD-BSS coverage to establish various ML connections.

In some embodiments, an MLD-BSS Controller 150 can be implemented as an independent network entity or integrated with an AP MLD.

In some embodiments, the AP MLD and non-AP MLD can leverage joint or selective transmission modes over one or multi-links (e.g. radio frequency channels) to reduce access latency, improve transmission reliability, and/or increase transmission throughput via the control of a non-AP MLD (e.g., non-AP MLD 110), an AP MLD (e.g. AP MLD 122), and/or coordinated by the MLD-MBSS Controller 150. ML communication may generally include bi-directional transmission between a non-AP MLD and an AP MLD via one or more of the multiple links between them. ML transmission may involve different transmission modes.

A joint ML downlink transmission mode may refer to the operation of one or more AP MLDs that can transmit the same Physical Layer Convergence Procedure (PLCP) Protocol Data Unit (PPDU) to the non-AP MLD over MLs at the same time. The non-AP MLD may combine the received signals in the baseband to improve the signal-to-noise-ratio (SINR) of received signals for increasing the reliability of transmissions or select the best signal from the multiple received signals in a medium access control (MAC) layer. A joint ML uplink transmission mode may also refer to a non-AP MLD that can transmit the same PPDU to an AP MLD over MLs at the same time. The AP MLD may combine the received signals in the baseband processor to improve the signal-to-noise-ratio (SINR) of received signals or select the best signal from the multiple received signals in the MAC layer for increasing the reliability of transmissions.

A selective ML downlink transmission mode may refer to the AP MLD 120 and/or AP MLD 122 that can transmit a downlink PPDU to a non-AP MLD 110 over one link of multiple links. The non-AP MLD 110 may selectively receive the transmission from either AP MLD 120 or 122 over the MLs. The selective ML uplink transmission mode may refer to that a non-AP MLD 110 transmits an uplink PPDU to one or more AP MLD over one of the ML connections. The AP MLD 122 may receive the signal from the non-AP MLD 110 over the ML, which can be coordinated by the MLD-BSS Controller 150. The selective ML transmission mode may be used by the wireless station or access point to reduce the access latency via selecting the first available link among ML connections for the transmission.

A simplex ML transmission mode may refer to the operation that different PPDUs can be concurrently transmitted over MLs by the AP MLD 122 in downlink (or non-AP MLD 110 in uplink) or can be concurrently received by the non-AP MLD 110 (or AP MLD 122). However, this may not allow to concurrently transmit a PPDU by the non-AP MLD 110 (or AP MLD 122) and receive another PPDU by the same non-AP MLD 110 (or AP MLD 122).

A duplex ML transmission mode may refer to the operation that a PPDU can be transmitted over one ML by the non-AP MLD 110 (or AP MLD 122), while another PPDU is received over another ML by the same non-AP MLD 110 (or AP MLD 122) concurrently. The duplex transmission operation provides a flexible way of communication between the non-AP MLD and the AP MLD.

Figure 2A:
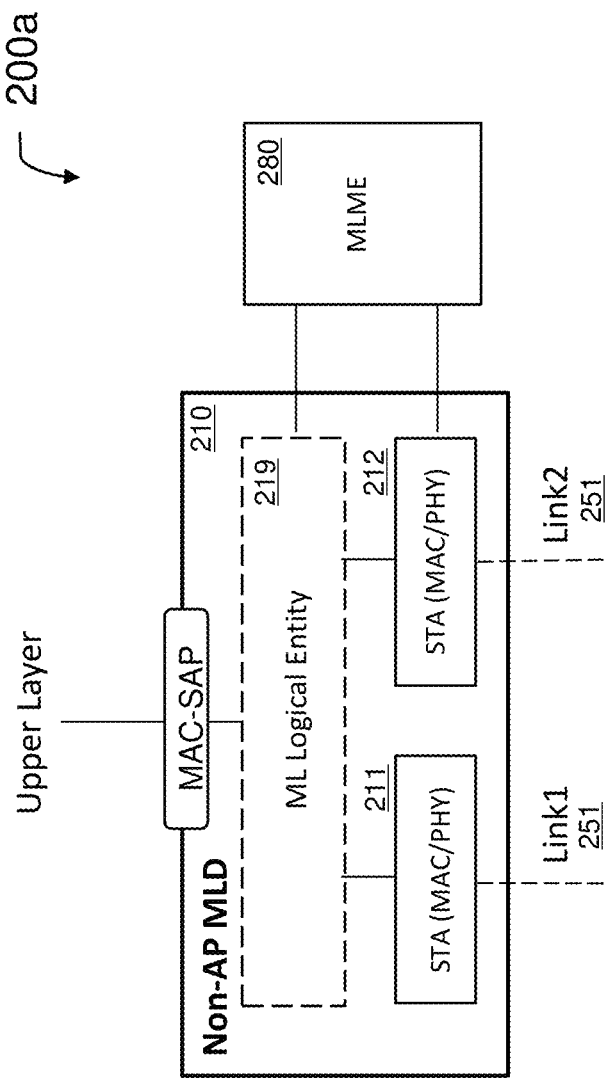
FIGS. 2A-2C illustrate example reference architectures of a multi-link station device and a multi-link access point device.
Figure 2B:
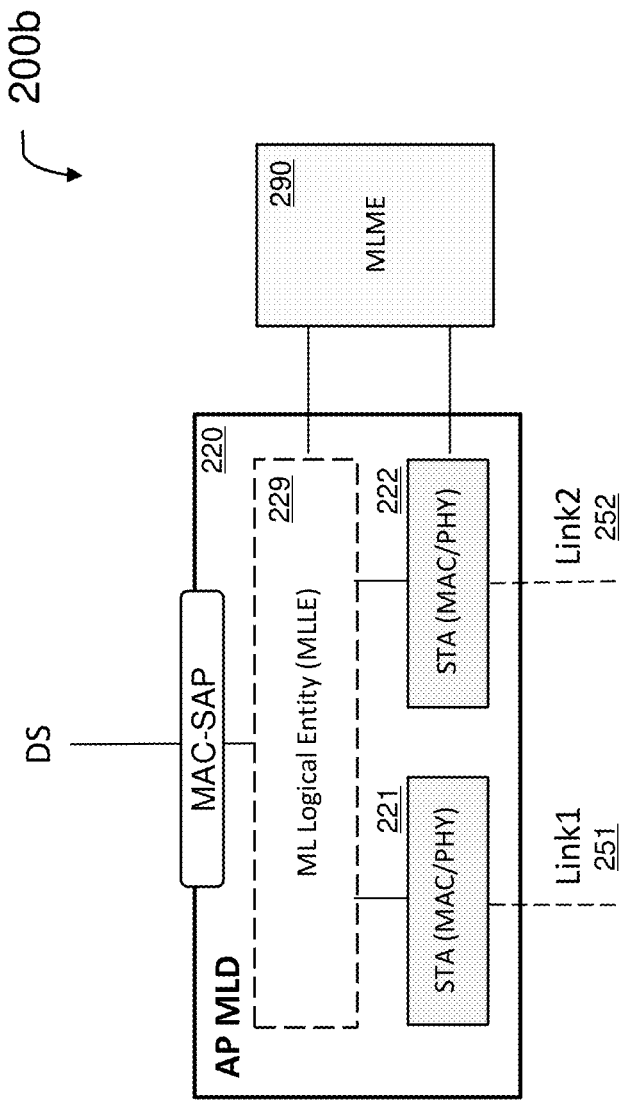
Figure 2C:
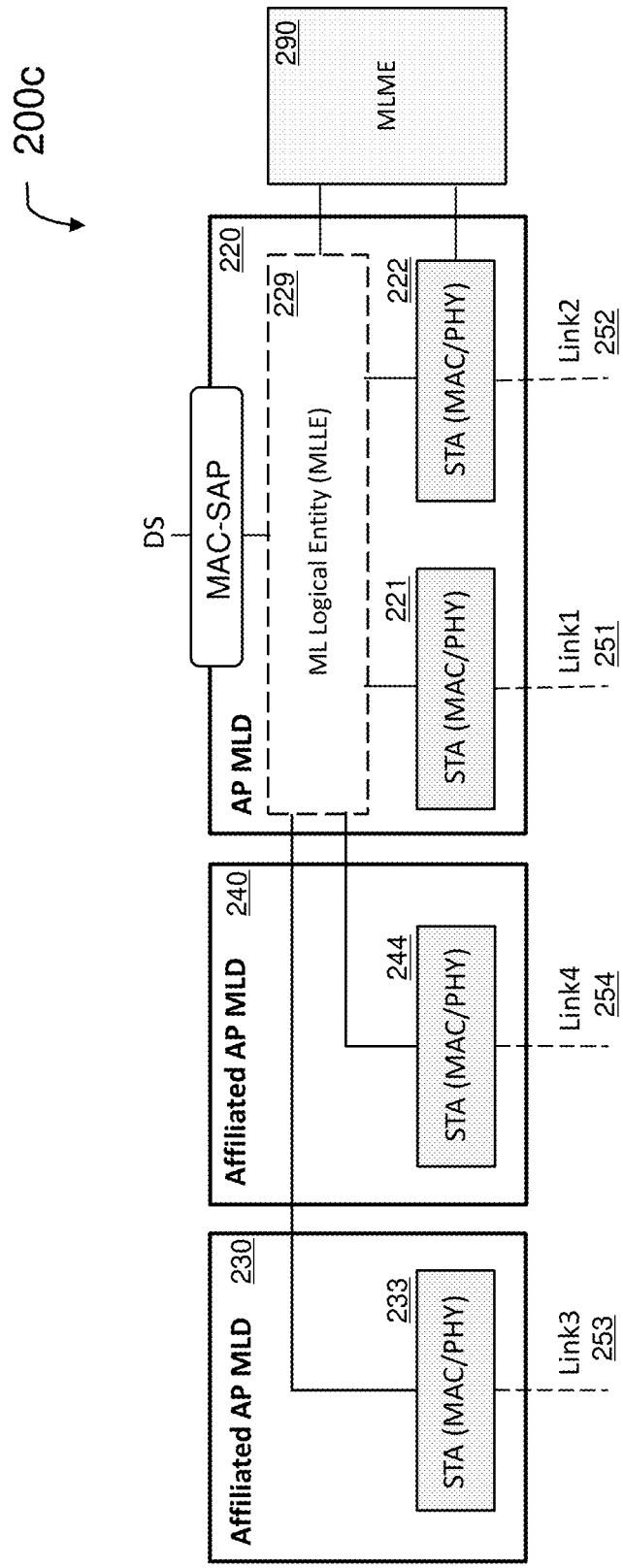

FIGS. 2A-2C illustrate example ML stations and ML access point architectures. In a first example embodiment, as illustrated in FIG. 2A, a ML station 200a may include a non-AP MLD 210 and a MAC Layer Management Entity (MLME) 280.

The non-AP MLD 210 may include a Multi-Link Logical Entity (MLLE) 219. The MLLE 219 may provide various 802.11 upper layer MAC functionalities. The MLLE 219 can communicate with radio stations 211, 212 of non-AP MLD 210 through internal interfaces. The MLME 280 may manage the operation of non-AP MLD 210 including link configuration, enablement/disablement, status monitoring, etc.

The non-AP MLD 210 may include a radio station 211. Radio station 211 may provide various 802.11 low layer MAC and PHY layer functionalities for operating on the wireless link (Link 1) 251.

The non-AP MLD 210 may include a radio station 212 that can provide 802.11 low layer MAC and PHY functionalities for operating on the wireless link (Link 2) 252.

The non-AP MLD 210 may include a non-AP MLD 210 that may consist of multiple radio stations, wherein each radio station may operate on a separate radio frequency channel. The wireless link 251 and 252 can operate different radio frequency channels connecting to the AP MLD 220.

In a second example embodiment, as illustrated in FIG. 2B, the ML access point 200b may include an AP MLD 220 and MAC Layer Management Entity (MLME) 290.

The AP MLD 220 may include a Multi-Link Logical Entity (MLLE) 229 which can contain 802.11 upper layer MAC functionality. The MLLE 229 can communicate to the radio station 221 and 222 of AP MLD 220 through internal interfaces. The MLME 290 may manage the operation of AP MLD 220, which may include link configuration, enablement/disablement, status monitoring, etc. The MLME 290 may be implemented as an individual network entity or integrated with an MLD-Controller.

The AP MLD 220 may include a radio station 221 which can contain 802.11 low layer MAC functions and PHY for operating on the wireless link (Link 1) 251.

The AP MLD 220 may include a radio station 222 which can contain 802.11 low layer MAC functions and PHY for operating on the wireless link (Link 2) 252.

An AP MLD 220 may consist of multiple radio stations, each of which can operate on a separate radio frequency channel. The wireless links 251 and 252 can operate on different radio frequency channels connecting to non-AP MLD 210.

In a third example embodiment, as illustrated in FIG. 2C, the ML access point group 200c may include an AP MLD 220, an affiliated AP MLD 230, an affiliated AP MLD 240 and a MAC Layer Management Entity (MLME) 290. The affiliated AP MLDs 230, 240 may only contain a radio station 233, 244. In some instances, affiliated AP MLDs 230, 240 may or may not be collocated with the AP MLD 220.

The AP MLD 220 may include a Multi-Link Logical Entity (MLLE) 229 which contains 802.11 upper layer MAC functions. The MLLE 229 may communicate to the radio station 221 and 222 of AP MLD 220 through its internal interfaces. It may also communicate to the radio station 233 and 244 in the affiliated AP MLDs 230 and 240 through respective external interfaces. The MLME 290 may manage operation of the AP MLD 220 and its affiliated AP MLD 230 and 240 including link configuration, enablement/disablement, state monitoring, etc. It may be implemented as an individual network entity or integrated with MLD-Controller.

The AP MLD 220 may include a radio station 221 which contains 802.11 low layer MAC and PHY functions for operating on the wireless link (Link 1) 251.

The AP MLD 220 may include a radio station 222 which contains 802.11 low layer MAC and PHY functions for operating on the wireless link (Link 2) 252.

The AP MLD 220 may include a radio station 233 that is within the affiliated AP MLD 230. The radio station 233 may include 802.11 low layer MAC and PHY functions for operating on the wireless link (Link 3) 253.

The AP MLD 220 may include a radio station 244 that is within the affiliated AP MLD 240. The radio station 244 may include 802.11 low layer MAC and PHY functions for operating on the wireless link (Link 4) 254.

The wireless link 251 and 252 operate different radio frequency channels which may be in the same frequency band or different frequency bands, like 2.4 GHz, 5 GHz or 6 GHz band. The links could have the same channel bandwidth, like 20 MHz, 40 MHz, 80 MHz, or 160 MHz; or allow different channel bandwidth combinations, such as 160 MHz+20 MHz, or 160 MHz+80 MHz, etc.

The wireless links 253, 254 of affiliated AP MLDs 230, 240 may operate on the same or different radio frequency channels from wireless link 251 or 252, which can depend on the radio network planning and frequency channel configurations. The links may support different channel bandwidth combinations, such as 160 MHz+20 MHz, or 160 MHz+80 MHz, etc.

An AP MLD 220 may form an MLD-BSS via assigning one or more links as primary link(s). The AP MLD 220 may form a MLD-BSS via assigning other link(s) as an alternate link(s).

The AP MLD 220 may form a MLD-BSS via creating a unique BSSID, which may be referred to as MLD-BSSID, to identify this AP MLD in the transmission over either the primary link or alternate link(s). Accordingly, a non-AP MLD may treat the AP MLD as a single network entity no matter their communications through primary link(s) or alternate link(s).

The AP MLD 220 may form an MLD-BSS via transmitting over the primary link(s) Beacon frames in a backward compatible frame format to carry the information about this AP MLD so that both non-AP MLDs and/or legacy stations can receive and decode this information for associations and data transmissions.

The AP MLD 220 may communicate with the non-AP MLD 210 in MLD-BSS to determine an anchored link for power saving operation mode.

The AP MLD 220 may communicate with via using the anchored link with the associated non-AP MLD 210 of MLD-BSS in the power saving operation mode.

The AP MLD 220 and non-AP MLD 210 may turn on all radio stations and keep them always-on in MLD normal operation. However, this may create an issue of power consumption, especially for a battery-operated non-AP MLD 210. To address this power consumption problem, the non-AP MLD 210 may transition to an MLD power saving operation upon completion of data communication with the AP MLD 220.

In the normal operation, the non-AP MLD 210 may keep tracking the operation of each radio station. When the non-AP MLD 210 finishes ML transmission, it may keep the anchored link in the power saving operation mode and turn off other radio stations of the MLD. The non-AP MLD 210 may send a notification about its MLD operation state information to the AP MLD 220 explicitly. The non-AP MLD 210 and/or the AP MLD 220 may switch to the MLD power saving operation mode implicitly at the expiration of their transmission inactivity timers which are set to the same parameters in monitoring of transmissions related to the non-AP MLD 210.

In another power saving operation scenario, the non-AP MLD 210 may keep the anchored link active and change other radio stations to the power saving operation mode after it finishes ML transmissions so that the non-AP MLD 210 and AP MLD 220 can communicate at any time over the anchored link. The non-AP MLD 210 may send a notification about its MLD operation state information to the AP MLD 220 explicitly. The non-AP MLD 210 and/or the AP MLD 220 may also switch to the MLD power saving operation mode implicitly at the expiration of their transmission inactivity timers which are set to the same parameters in monitoring of transmissions related to the non-AP MLD 210. A non-AP MLD may have same or different MLD power saving operation setting from other non-AP MLDs.

For ML downlink transmission in the power saving operation, the AP MLD 220 may transmit a signal including ML wakeup indication information to the non-AP MLD 210 in power saving operation mode first over the anchored link to wake it up and then setup ML TXOP for the ML downlink transmission.

For ML uplink transmission in the power saving operation, the non-AP MLD 210 can turn on some or all ML radio stations by itself to find idle links and select the corresponding links for ML transmissions.

In the ML power saving mechanism as described herein, a non-AP MLD 210 may need to maintain two operation modes: MLD Normal Operation (MLD-NO) and MLD Power Saving Operation (MLD-PSO).

In MLD-NO mode, one or more links can be enabled per ML transmission requirements and in the active state. In MLD-PSO mode, the links of a non-AP MLD can be divided into an anchored link and non-anchored link(s). In the MLD-PSO mode, only the anchored link may be enabled and in the active or the power saving operation state. The non-anchored link(s) may be disabled (or in power saving state) to reduce power consumption.

The anchored link in MLD Power Saving Operation could be setup in different ways. One such way is an AP MLD assigned anchored link. In this approach, the AP MLD may indicate one or more anchored links in Beacon frame or other management frames for non-AP MLDs to anchor on in their MLD-PSO.

Another such way can include an AP MLD and non-AP MLD negotiated anchored link allocation. A non-AP MLD may send an MLD Anchored Link Request message to the AP MLD. The AP MLD can respond to the request and confirms the anchored link to the non-AP MLD or assign a different anchored link to this non-AP MLD if it does not grant the anchored link proposed by the non-AP MLD in the request message.

Another such way can include a non-AP MLD autonomously determined anchored link. An AP MLD can announce ML information in beacon frames. The non-AP MLD may select one link as the anchored link in MLD-PSO. The non-AP MLD may or may not notify the selection of anchored link to the AP MLD.

Once the anchored link is determined, a non-AP MLD can monitor DL frames on the anchored link over which the AP MLD may send the multi-link wakeup indication information for this non-AP MLD. If no anchored link is notified to the AP MLD, the AP MLD may send the multi-link wakeup indication information on all links to wake up this non-AP MLD.

Any of the non-AP MLD or AP MLD can initiate the MLD operation mode transitioning to MLD-PSO.

A non-AP MLD initiated power saving operation can include initiating the MLD operation to enter the MLD-PSO from MLD-NO after the inactivity timer expiration or immediately if the non-AP MLD has no buffered data for UL transmission, and notifying the operation mode change to the AP MLD.

An AP MLD initiated power saving operation can include send a MLD Operation Mode Change Request message to the non-AP MLD immediately or after inactivity timer expiration if the AP MLD has no downlink data for the non-AP MLD. Once the non-AP MLD receives this request message, it changes a MLD operation mode to MLD-PSO and sends the acknowledgement back to the AP MLD to confirm the transition.

Either non-AP MLD or AP MLD can initiate the MLD operation mode transition to MLD-NO.

A non-AP MLD initiated normal operation can include changing a MLD operation if the non-AP MLD in the power saving operation mode has uplink data to send the mode to MLD-NO at any time and start for uplink transmission over multiple available links.

An AP MLD initiated normal operation can include the ML wake-up indication information in a beacon frame or control frame over the anchored link if the AP MLD wants to wake up a non-AP MLD. Once the non-AP MLD is awake and enters the MLD-NO mode, the AP MLD can start downlink transmissions over multiple links.

Figure 3A:
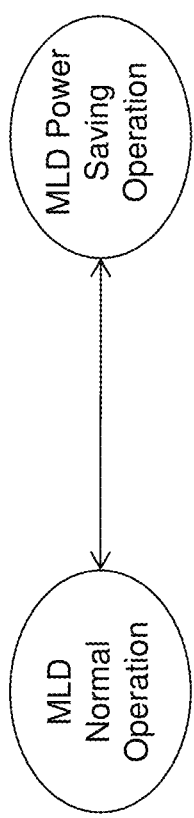
FIGS. 3A-3C illustrate example state transit diagrams of multi-link operation.
Figure 3B:
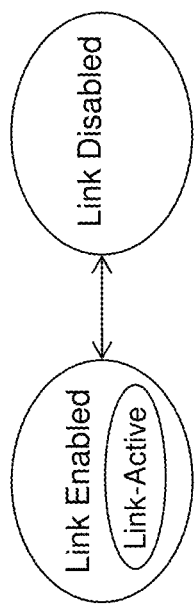
Figure 3C:
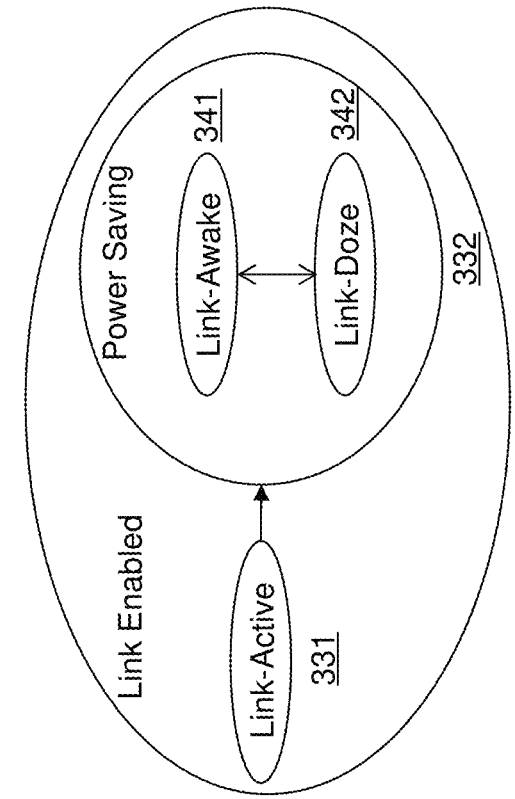

FIGS. 3A-3C illustrate example diagrams of non-AP MLD and link state transition diagrams. The AP MLD may maintain a similar state diagram for each non-AP MLD.

In the first embodiment shown in FIG. 3A, a non-AP MLD may include any of two MLD Operation modes. A first MLD Operation mode can include a MLD Normal Operation (MLD-NO) 311. In MLD-NO, the non-AP MLD 210 can enable links based on the need of ML transmission. In the MLD-NO 311, all links can be in active state, and are configured to receive and transmit frames at any time.

A second MLD Operation mode can include a MLD Power Saving Operation (MLD-PSO) 312. MLD-PSO can include the non-AP MLD 210 keeping only one link enabled (i.e., the anchored link), while disabling other links (i.e., the non-anchored links). In the MLD PSO 312, the non-anchored link may be disabled and does not perform any activity. In other power saving scenarios, the non-AP MLD may keep the anchored link active and keep the non-anchored link(s) into the power saving state or disabled.

In the second embodiment shown in FIG. 3B, the diagram illustrates an example state transition diagram for a non-anchored link. An enabled link 321 may indicate a link that is in an active state to allow non-AP MLD to transmit and receive frames over at any time. A disabled link 322 indicates a link that is disabled and not allowed any activity.

In the third embodiment shown in FIG. 3C, the diagram illustrates the state transition diagram for the anchored link. Once the anchored link is assigned, it may be in an active state. In some power saving scenarios, the non-anchored link can be set in the power saving state 332.

An active state 331 may indicate a link that is allowed to transmit to or received frames from AP MLD 220 at any time. A power saving state 332 may indicate a link that is in the power saving state and can be further in the awake state 341 to monitor frames on the anchored link or in a doze state 342 to stop any activity.

Figure 4A:
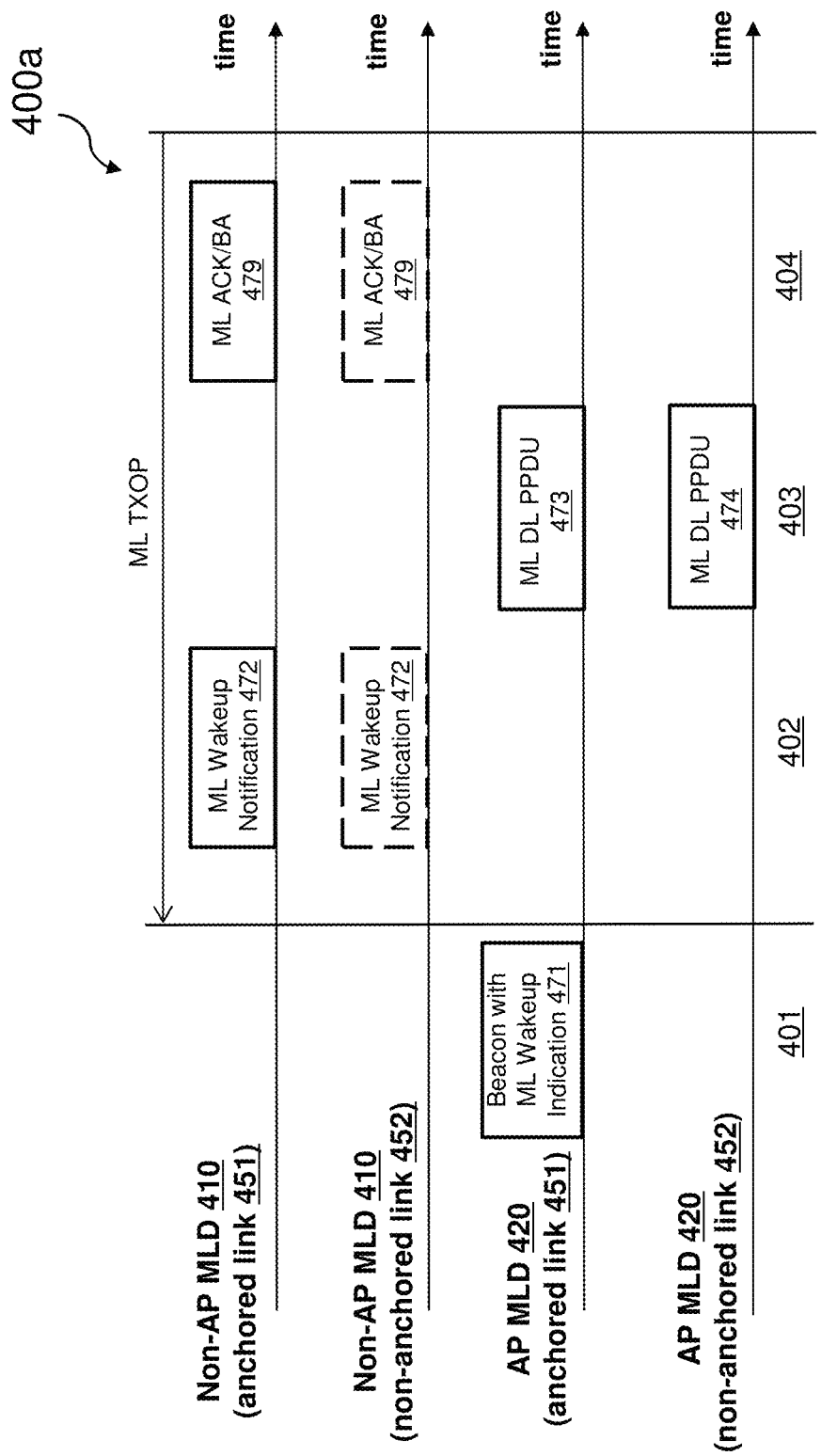
FIGS. 4A-4C illustrate example signaling processes of multi-link anchored link establishment for power saving operation.
Figure 4B:
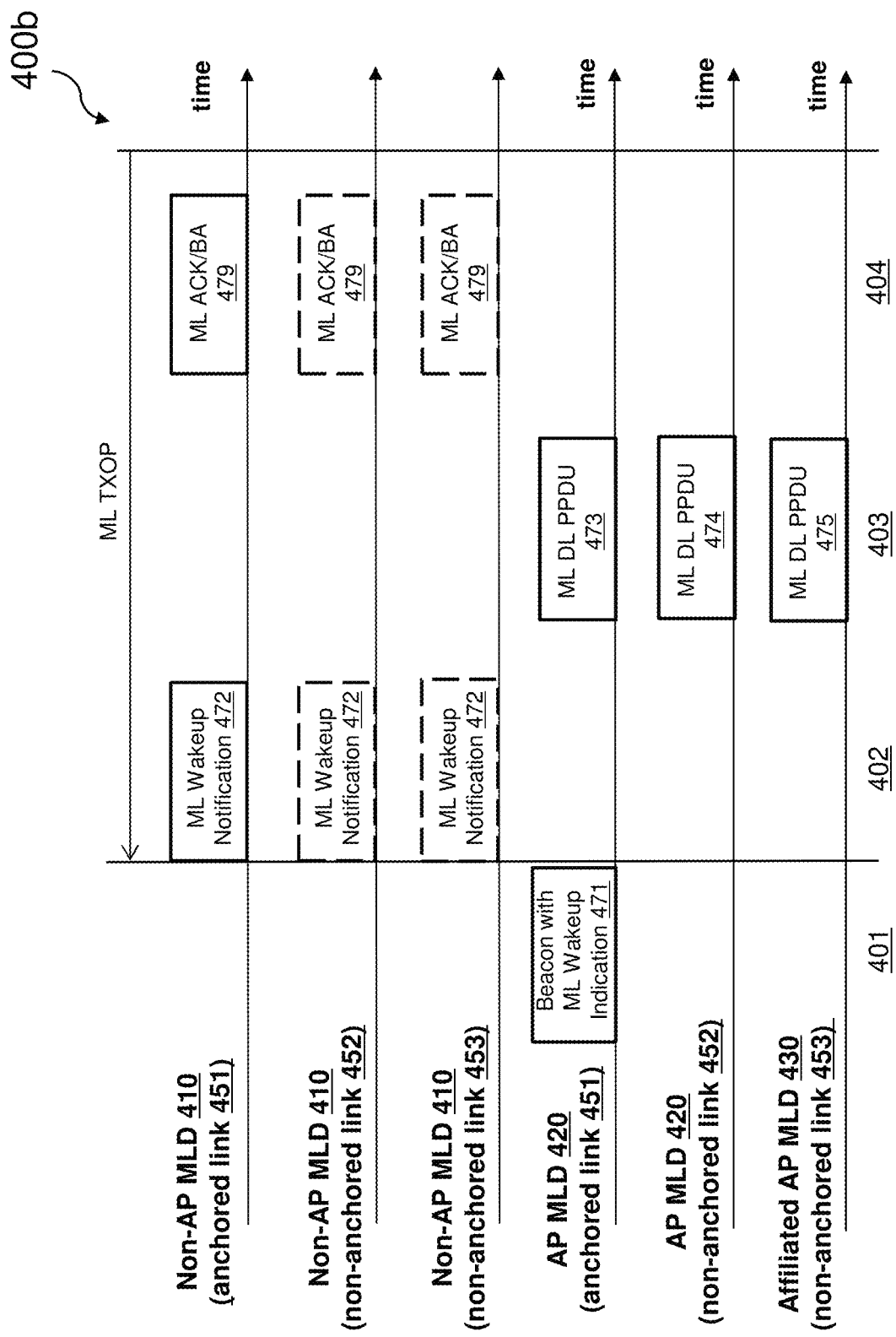
Figure 4C:
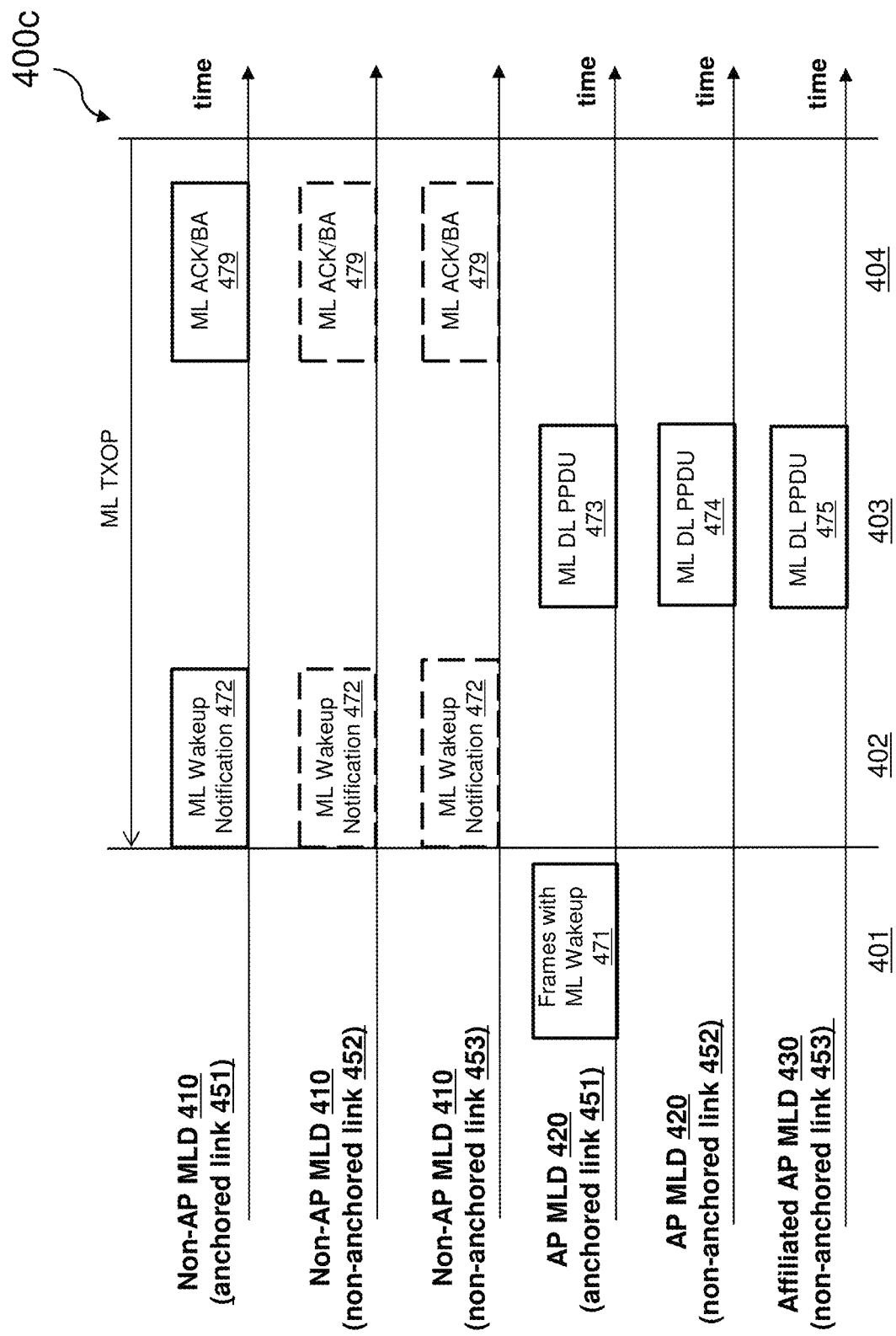

FIGS. 4A-4C illustrate example signaling processes 400*a-c* to wake-up a non-AP MLD in a power saving operation to receive frames from an AP MLD.

In the first embodiment shown in FIG. 4A, a non-AP MLD 410 may be in a MLD-PSO, in which the non-AP MLD 410 can keep an anchored link (e.g. 451) in the power saving operation and disables the non-anchored link (e.g. 452) to reduce power consumption.

In step 401, the AP MLD 420 may send sends a ML wake-up indication 471 in an Information Element of Beacon frame over the anchored link 451 which the non-AP MLD 410 listens to in the power saving operation. The AP MLD 420 may include an indication to wake-up non-anchored link(s) 452 in the IE of ML wakeup indication information.

In step 402, the non-AP MLD 410 may wake up at the designated time and receives the ML wakeup indication information in Beacon frame. Waking up the non-AP MLD 410 may include transitioning to an active or normal operation state and enabling disabled links. The non-AP MLD 410 may transition to MLD-NO and transmits a ML Wakeup Notification message 472 to the AP MLD 420 over the anchored link 451. If the AP MLD 420 includes an indication to wake-up non-anchored link(s) 452 in the ML wakeup indication information, the non-AP MLD 410 may enable the non-anchored link(s) 452 and transmit the ML Wakeup Notification message 472 to the AP MLD 420 on the non-anchored link(s) 452. The ML Wakeup Notification message can be used to establish a ML transmission opportunity (TXOP) for following ML transmissions. It can also be used to setup NAVs by other nearby stations to prevent from interfering to the ML transmissions.

In step 403, the AP MLD 420 can receive the ML Wakeup Notification message 472 and determine that the non-AP MLD 410 is in the active state for requested link(s) and is ready to receive downlink frames. The AP MLD 420 can transmit DL PPDU 473 over the anchored link 451 and/or DL PPDU 474 over the non-anchored link 452.

In step 404, the non-AP MLD 410 can receive the DL PPDU 473 and/or 474 and perform error checking. The non-AP MLD 410 can send the ML ACK/BA 479 back to the AP MLD 420 over any link(s), e.g. links 451 and/or 452.

If ML transmission is completed, the ML TXOP can be released. The non-AP MLD 410 may switch its operation mode to MLD-PSO implicitly or explicitly to reduce the power consumption.

In the second embodiment shown in FIG. 4B, the non-AP MLD 410 may be in MLD-PSO, in which the non-AP MLD 410 may keep an anchored link (e.g. 451) in the power saving operation and disable non-anchored link (e.g. 452) to reduce power consumption.

In step 401, the AP MLD 420 may want to wake up the non-AP MLD 410 by sending the ML Wake-up information in Beacon frame over the anchored link 451 which the non-AP MLD 410 listens to in the power saving operation. The AP MLD 420 may include an indication to wake-up non-anchored link(s) 452 of non-AP MLD 410 and/or non-anchored link(s) 453 associating to the affiliated AP MLD 430 in the ML wakeup indication information.

In step 402, the non-AP MLD 410 may wake up at the designated time and receives the ML wakeup indication information in Beacon frame. The non-AP MLD may transition to MLD-NO and transmit a ML Wakeup Notification message 472 to the AP MLD 420 over the anchored link 451.

If the AP MLD 420 includes an indication to wake-up non-anchored link(s) 452 of non-AP MLD in the ML wakeup indication information, the non-AP MLD 410 may enable the non-anchored link(s) 452 and transmits the ML Wakeup Notification message 472 to the AP MLD 420 over non-anchored link(s) 452. If the AP MLD 420 indicates to wake-up the non-anchored link(s) 453 associating to the affiliated AP MLD 430 in the ML wakeup indication information, the non-AP MLD 410 can enable the non-anchored link 453 associating to the affiliated AP MLD 430 and transmit the ML Wakeup Notification message 472 to the AP MLD 420 over the non-anchored link(s) 453 associating to the affiliated AP MLD 430. The ML Wakeup Notification message can be used to initiate the ML TXOP establishment for the following ML transmissions. The ML Wakeup Notification message can also be used to setup NAVs by other nearby stations to prevent from interfering to the ML transmissions.

In step 403, the AP MLD 420 can receive the ML Wakeup Notification message 472 and determine that the non-AP MLD 410 is in the active state for requested links and ready to receive downlink frames. The AP MLD 420 can transmit DL PPDU 473 over anchored link 451, DL PPDU 474 over non-anchored link 452, and/or DL PPDU 475 over non-anchored link 453.

In step 404, the non-AP MLD 410 can receive the DL PPDU 473, 474 and/or 475, and perform error checking. The non-AP MLD 410 can then send ML ACK or BA 479 back to the AP MLD 420 over any link(s).

After the ML transmission is completed, the ML TXOP can be released. The non-AP MLD 410 may switch its operation mode to MLD-PSO implicitly or explicitly to reduce the power consumption.

In the third embodiment shown in FIG. 4C, the non-AP MLD 410 may be in MLD-PSO, in which the non-AP MLD 410 keeps an anchored link (e.g. 451) in the active operation and puts non-anchored links (e.g. 452, 453) in the power saving operation (i.e., in either the disabled or power saving state).

In step 401, the AP MLD 420 may want to wake up other links of the non-AP MLD 410 and sends at any time the ML wakeup indication information in a management frame or control frame over the anchored link 451 which the non-AP MLD 410 monitors to in the normal operation (i.e. in the active state). The AP MLD 420 may include an indication to wake-up non-anchored link(s) 452 of non-AP MLD 410 and/or non-anchored link(s) 453 associating to the affiliated AP MLD 430 in the ML wakeup indication information.

In step 402, the non-AP MLD 410 receiving the ML wakeup indication information in a management or control frame may transmit a ML Wakeup Notification message 472 to the AP MLD 420 over the anchored link 451. If the AP MLD 420 includes an indication to wake-up (or enable) non-anchored link(s) 452 of non-AP MLD in the ML wakeup indication information, the non-AP MLD 410 may wake up or enable the non-anchored link(s) 452 and transmit the ML Wakeup Notification message 472 to the AP MLD 420 over non-anchored link(s) 452. If the AP MLD 420 indicates to wake-up (or enable) the non-anchored link(s) 453 associating to the affiliated AP MLD 430 in the ML wakeup indication information, the non-AP MLD 410 may wake up or enable the non-anchored link 453 associating to the affiliated AP MLD 430 and transmit the ML Wakeup Notification message 472 to the AP MLD 420 over the non-anchored link(s) 453 associating to the affiliated AP MLD 430. The ML Wakeup Notification message can be used to initiate the ML TXOP establishment for the following ML transmissions. The ML Wakeup Notification message can also be used to setup NAVs by other nearby stations to prevent from interfering to the ML transmissions.

In step 403, the AP MLD 420 receiving the ML Wakeup Notification message 472 may determine that the non-AP MLD 410 is in the normal operation now and ready to receive downlink frames. The AP MLD 420 can transmit DL PPDU 473 over anchored link 451, DL PPDU 474 over non-anchored link 452, and/or DL PPDU 475 over non-anchored link 453.

In step 404, the non-AP MLD 410 receiving the DL PPDU 473, 474 and/or 475, can perform error checking. The non-AP MLD 410 can send ML ACK or BA 479 back to the AP MLD 420 over any link(s).

After the ML transmission is completed, the ML TXOP can be released. The non-AP MLD 410 may switch its operation mode to MLD-PSO implicitly or explicitly to reduce the power consumption.

FIG. 5A-5D illustrate example data fields 500a-d that include ML wakeup indication information that can be used to wake-up a non-AP MLD. The ML wakeup indication information can be in the format of Information Element (IE), in Beacon frames, or another management frame type. The ML wakeup indication information may be included in a control frame or a data frame.

Figure 5A:
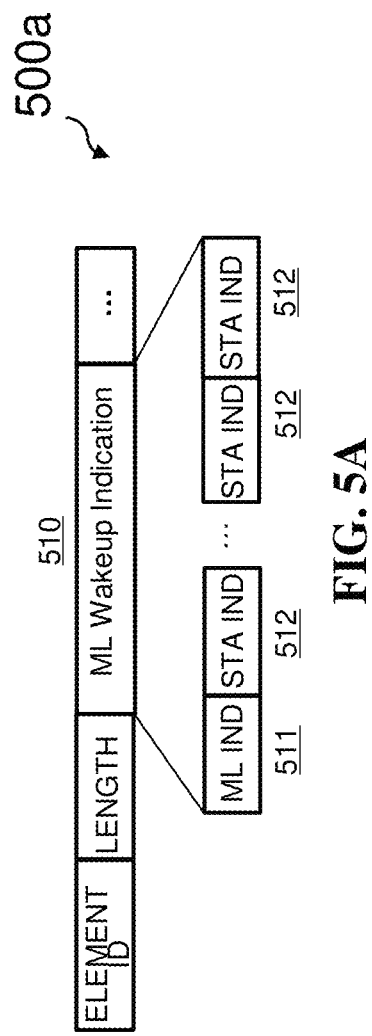
FIGS. 5A-5D illustrate example multi-link wakeup information in different formats to wake-up a multi-link station in power saving operation.

In a first example embodiment shown in FIG. 5A, the ML wakeup indication information 510 included in an IE may include various fields, such as a ML Indication field (ML IND) 511 and one or more STA Indication (STA IND) 512 fields. The ML IND 511 field may include a bit map indicating corresponding links.

If an AP MLD wants to wake up a non-AP MLD indicated by the corresponding bit in STA IND 512 field on a particular link, it can set the bit corresponding to the link in the ML IND 511 field to "1," and include the corresponding STA IND 512 field in the ML wakeup indication information 510. If none of non-AP MLD are to be waked up on a link, the AP MLD can set the bit corresponding to the link in the ML IND 511 to "0," and not include the STA IND 512 field corresponding to that link in the ML wakeup indication information 510. The length of ML IND bit map may be set to the default value (e.g., 4) or changed to a value according to the number of supported multi-links specified in EHT Capability information.

A STA IND 512 can include a bit map field that corresponds to a link. Each bit in the STA IND 512 can correspond to an associated non-AP MLD on that link. The STA IND 512 bit-map size can be determined by the default value or changed to the value specified by the EHT Capability information, which can be based on the number of associated non-AP MLDs in MLD BSS.

If the AP MLD wants to wake up a non-AP MLD, it can set the corresponding bit in the STA IND bit map 512 to "1." Otherwise, the corresponding bit can be set to "0." If the AP MLD wants to wake up a non-AP MLD on a specific link to receive the downlink data, it can set a corresponding bit in the bit map of the STA IND 512 field corresponding to that link indicated by its corresponding bit in the ML IND 511 field.

When the non-AP MLD receives the ML wakeup indication information and determines that the corresponding bit of STA IND 512 is set to "1" on a particular link(s) indicated by the corresponding bit in the ML IND 511, the non-AP MLD can transition the corresponding link state to "active" and enters MLD-NO state to prepare for receiving downlink frames. The non-AP MLD can then send a ML Wakeup Notification message to the AP MLD.

Figure 5B:
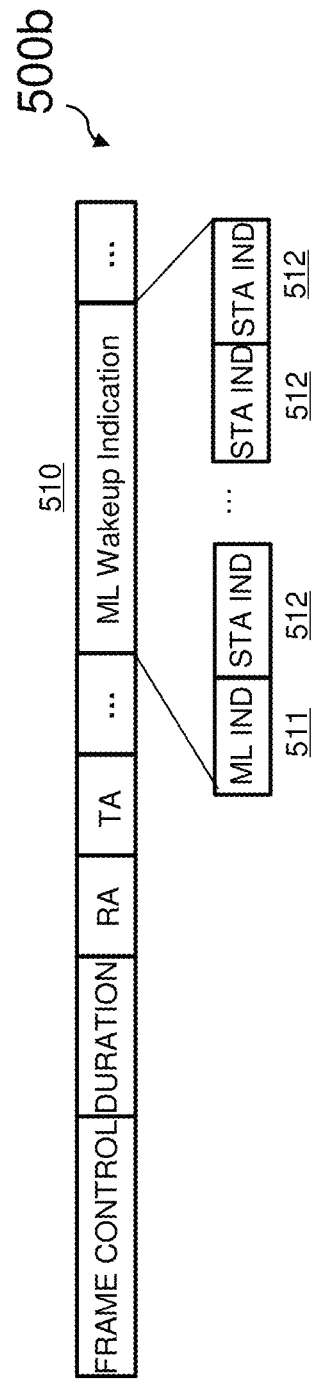

In a second example embodiment shown in FIG. 5B, the ML wakeup indication information can be included in a control frame or a data frame.

Figure 5C:
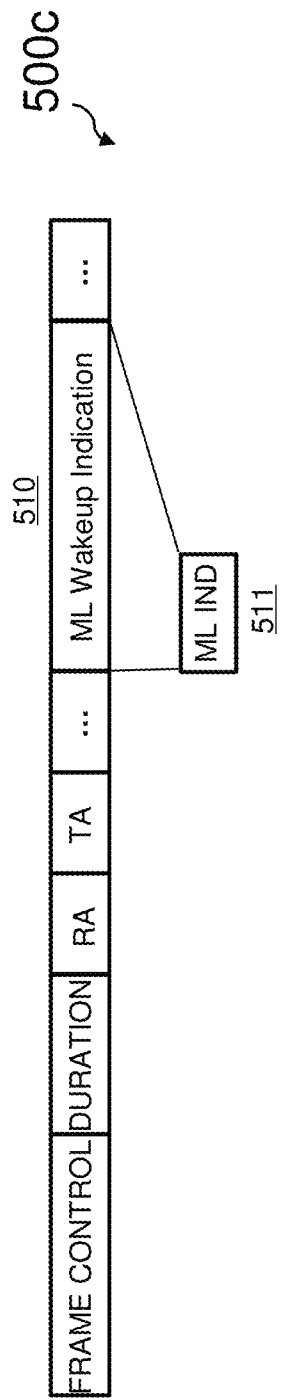

In a third embodiment shown in FIG. 5C, the ML wakeup indication information can be included in a control frame or a data frame which is sent to a non-AP MLD in a unicast frame. In a unicast frame, the bit in the ML IND 511 field corresponding to the link of the non-AP MLD to be waked up (or enabled) can be set to "1." Accordingly, other bits in ML IND 511 field can be set to "0." A STA IND 512 field may not be included in the ML wakeup indication information 510 in the unicast frame.

Figure 5D:
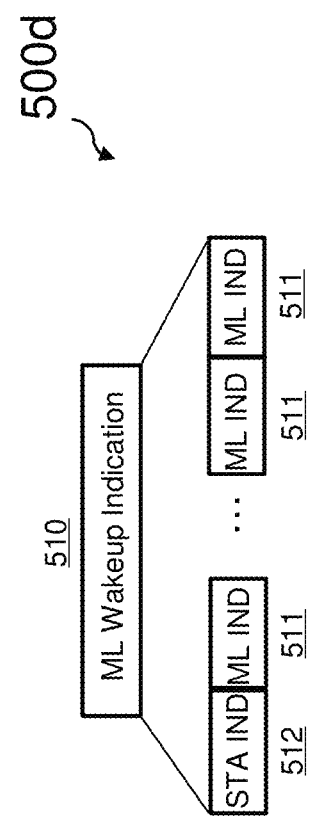

In a fourth embodiment shown in FIG. 5D, the ML wakeup indication information may be implemented as including one STA IND bitmap 512 field and zero or more ML IND bitmap 511 fields, each of which can be associated to the non-AP MLD to be waked up indicated in the STA IND bitmap 512.

Each bit of the STA IND bitmap 512 can correspond to a non-AP MLD. If an AP MLD wants to wake up a non-AP MLD in the power saving operation, the AP MLD can set the bit corresponding to the non-AP MLD to "1" in the STA IND bitmap 512. The AP MLD then may include the ML IND bitmap 511 field for the non-AP MLD and sets the bit(s) in ML IND bitmap 511 to indicate the link(s) to be waked up.

An AP MLD (or non-AP MLD) may set up the anchored link using explicit messages for ML power saving operation, such as ML Anchored Link Request and ML Anchored Link Response. An AP MLD (or non-AP MLD) may also use the same messages to switch the existing anchored link at any time for the cases like load balancing, interference avoidance, etc.

Figure 6:
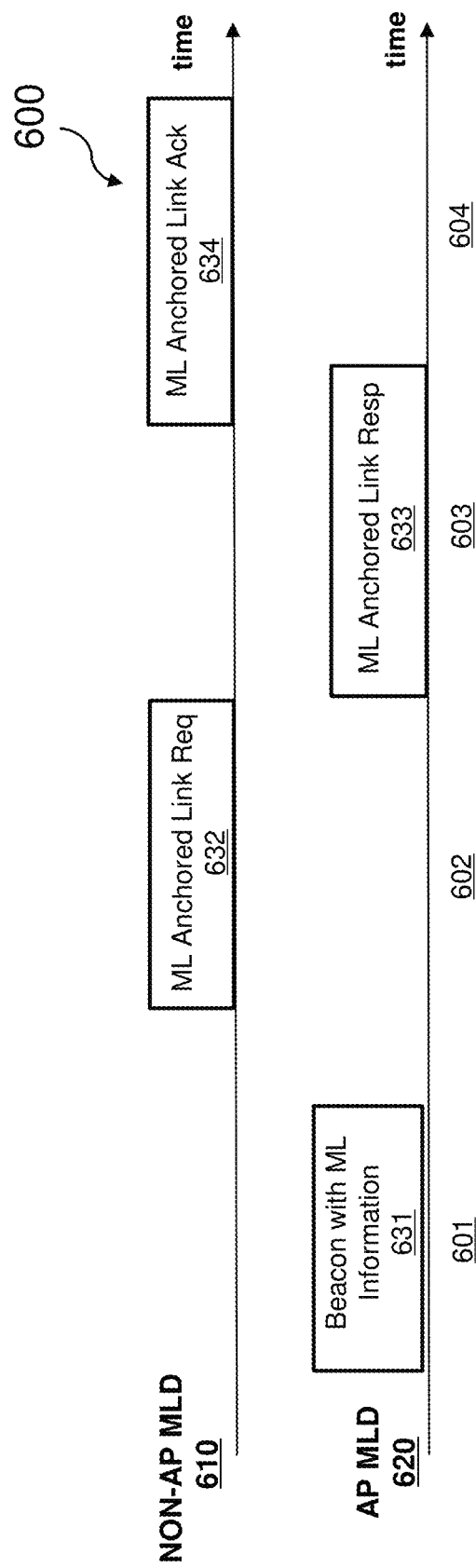
FIG. 6 illustrates an example signaling process 600 for establishing a ML anchored link.

FIG. 6 illustrates an example signaling process 600 for establishing a ML anchored link. The example as illustrated in FIG. 6 may illustrate a case of a non-AP MLD initiating the ML anchored link setup or exchange. Similarly, the AP MLD can also initiate the procedure as described herein.

In step 601, the AP MLD 620 can broadcast the ML information in Beacon frames 631.

In step 602, the non-AP MLD 610 may send a ML Anchored Link Request message 632 over any link. The non-AP MLD 610 may include an anchored link information, such as the identification of anchored link, channel information, switching time, other power saving parameter information, etc., for establishing an anchored link or switching a current anchored link.

In step 603, the AP MLD 620 can send a ML Anchored Link Response 633 to confirm the establishment of an anchored link or switching the anchored link if the AP MLD grants this request, or propose the alternate setting parameters if the AP MLD does not agree to this request.

In step 604, if the request is granted, the non-AP MLD can establish the anchored link for the ML power saving operation or switches the anchored link to the new anchored link at the switching time. If an alternate setting parameter is included in the response, the non-AP MLD 610 may send a ML Anchored Link Ack to confirm the anchored link establishment or switching of the anchored link. The non-AP MLD can then set up the anchored link or switch to the new one at the switching time. If the switching anchored link request is not granted, the non-AP MLD 610 and/or AP MLD 620 can keep the current anchored link for power saving operation.

Figure 7A:
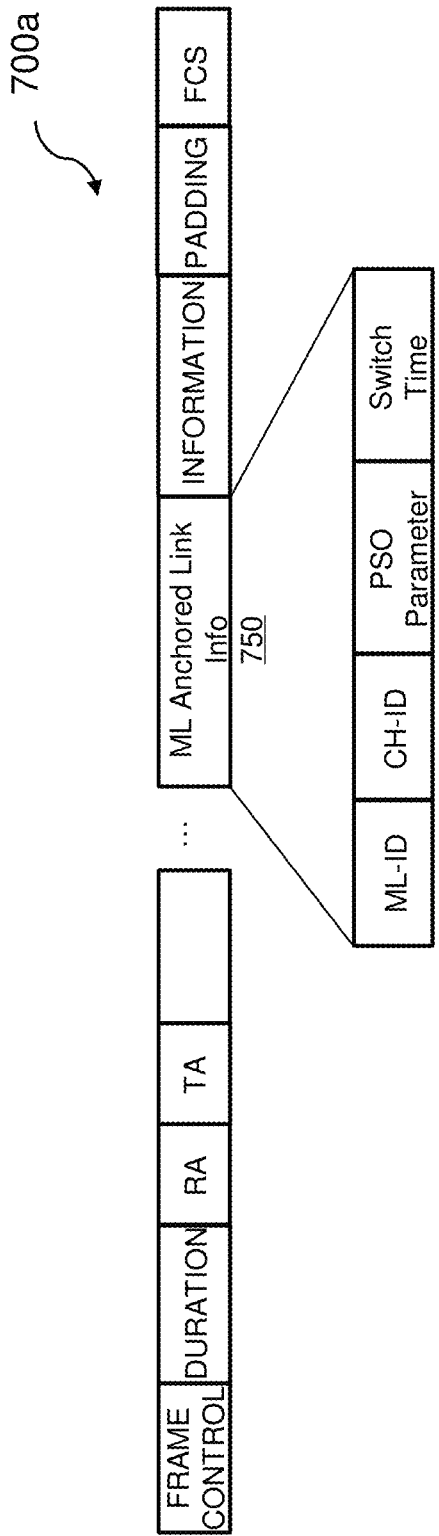
FIGS. 7A-7B illustrate example block diagrams of data fields that include ML Anchored Link Information.
Figure 7B:
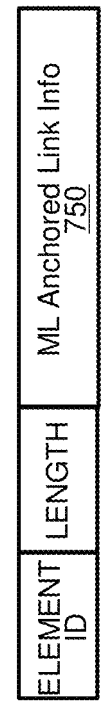

FIGS. 7A-7B illustrate example block diagrams of data fields that include ML Anchored Link Information. As shown in FIGS. 7A-7B, the ML Anchored Link Information 750 can be included in any of a MAC header of ML control frames or in Information Element (IE). The ML control frames may include, for example, a BA/ACK, RTS/CTS or ML Anchored Link Request/Response.

In a first example embodiment as shown in FIG. 7A, the MAC header may include frame control (FC) field to indicate the MAC frame type and other information about the frame. The MAC header may include a transmission duration of this frame, and any of a receiving address (RA), a transmission address (TA), and a destination address (DA).

The MAC header may include a ML Anchored Link Information field 750 to indicate the anchored link identifier, operating channel, power saving operation parameters (e.g., the inactivity timer value, default link state in the power saving operation, etc.), and/or the time of switching to (or using) the anchored link for ML power saving operation. The non-AP MLD may use this information to request setup the anchored link or switch to a new anchored link.

In the second example embodiment as shown in FIG. 7B, the ML Anchored Link Information 750 can be included in an Information Element, which can be used by the ML Anchored Link Request/Response messages or included in Beacon frames.

In some embodiments, a mechanism of establishing wireless communication system may include one or more multi-link logic access point devices and one more multi-link station devices. The multi-link logic access point device may include a multi-link logic entity that links a distributed system media (DSM) and multiple radio stations to form wireless communication links to the multi-link logic station device. The multi-link logic station device may include a multi-link logic entity that can link an upper layer service entity and multiple radio stations to form communication links with the multi-link logic access point devices.

In other embodiments, a mechanism of establishing multi-link communication can include that multi-link stations devices, operated and managed by multi-link logic entity and MAC layer management entity (MLME), may incorporate with the multi-link access point device for operating on normal operation mode and power saving mode.

In other embodiments, a method for multi-link communication includes receiving, by a wireless station, an indication message from a network node indicating that the network node is capable of transmitting information over one or more wireless links.

In other embodiments, an indication message from the network node capable of transmitting information can be obtained over one or more wireless links includes establishment of the power saving operation of multiple links.

In other embodiments, an indication message may include changing the communication link in power saving operation.

In other embodiments, a method for multi-link communication includes switching the operation between the normal and power saving operation mode.

In other embodiments, a method of switching the operation mode includes implementing link state transfer and synchronization between the multi-link station and one or more multi-link access points using a multi-link wakeup indication and a multi-link wake-up notification message.

Figure 8:
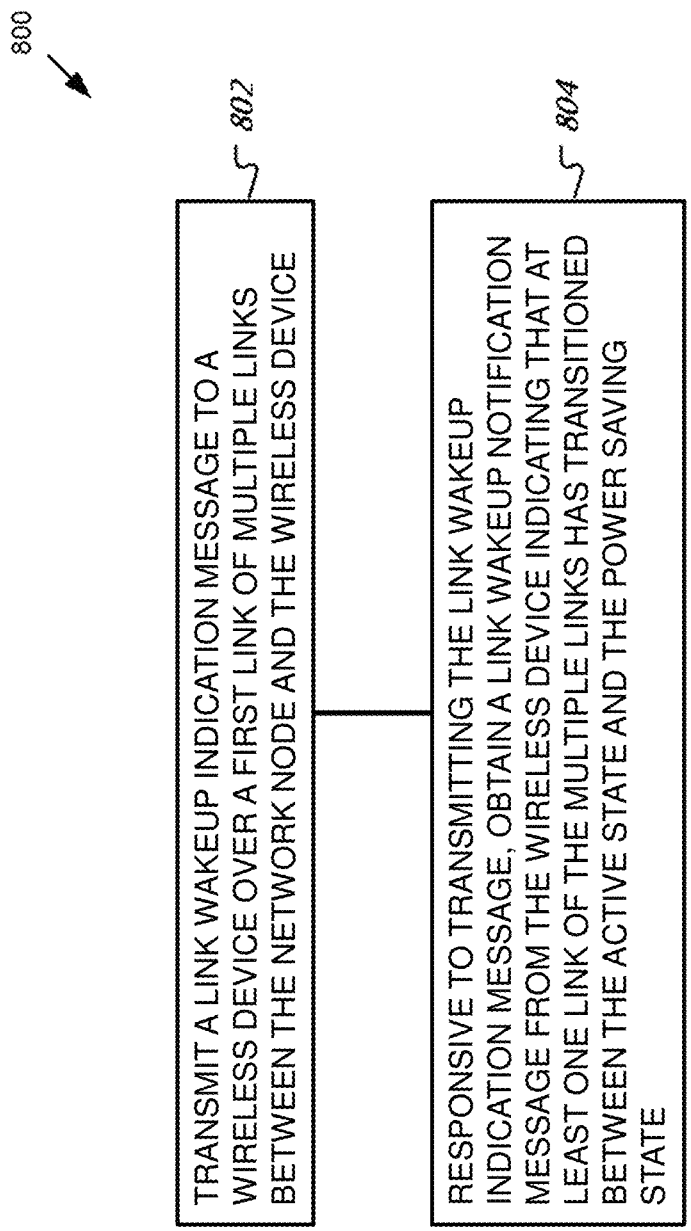
FIG. 8 is an example method for implementing power saving mechanisms in utilizing multiple wireless links between a wireless station and one or multiple access points.

FIG. 8 is an example method 800 for implementing power saving mechanisms in utilizing multiple wireless links between a wireless station and one or multiple access points.

In one exemplary embodiment, a method for wireless communication can include transmitting, by a network node, a link wakeup indication message to a wireless device over a first link of multiple links between the network node and the wireless device block 802). The network node may include an AP MLD (e.g., AP MLD 120, 122) as described herein. The wireless device can include a Non-AP MLD (e.g., Non-AP MLD 110, 112) as described herein. The link wakeup indication message can include ML wake-up indication 471 message as described herein. The link wakeup indication message may indicate a request to transition at least one link of the multiple links between an active state and a power saving state.

The method may include, responsive to transmitting the link wakeup indication message, obtaining, by the network node, a link wakeup notification message from the wireless device indicating that at least one link of the multiple links has transitioned between the active state and the power saving state (block 804). The link wakeup notification message may include a ML Wakeup Notification message 472 as described herein.

In some embodiments, the method includes, responsive to obtaining the link wakeup notification message from the wireless device, transmitting, by the network node, data to the wireless device over two or more of the multiple links between the network node and the wireless device.

In some embodiments, the wireless device is configured to transition the at least one link of the multiple links from the active state to the power saving state based on detecting an expiry of an activation timer.

In some embodiments, the multiple links include a primary link and at least one link between the network node and the wireless device, and wherein the first link includes the primary link.

In some embodiments, the method includes responsive to obtaining the link wakeup notification message from the wireless device, establishing, by the network node, a multi-link transmission opportunity for multilink data transmission between the network node and wireless device during the multi-link transmission opportunity.

In some embodiments, the method includes obtaining, by the network node, a multi-link acknowledgement message from the wireless device indicating that the data has been successfully received from the wireless device over the multiple links.

In some embodiments, the link wakeup indication message is transmitted over the primary link, and wherein the link wakeup indication message is sent to the wireless device over both the primary link and/or the at least one link.

In some embodiments, the network node includes a logical entity configured to control multi-link data transmission to a first set of radio stations internal to the network node and to a second set of radio stations external to the network node.

In some embodiments, the network node includes a MAC layer management entity (MLME) configured to manage a configuration of the multiple links.

In some embodiments, the power saving state enables only the primary link, and the active state enables both the primary link and the at least one link of the multiple links.

In some embodiments, the wireless device is configured to transition at least one link from the power saving state to the active state upon reception of the link wakeup indication message from the network node over the primary link.

In some embodiments, the link wakeup indication message is included in an information element of a management frame.

In some embodiments, the link wakeup indication message is included in a beacon frame.

In some embodiments, the link wakeup indication message incudes a multi-link indication field including a bitmap indicative of the multiple links between the network node and the wireless device.

In some embodiments, the wireless device is configured to transition from the power saving state to the active state based on determining that the bitmap of the multi-link indication field indicates that the multiple links between the network node and wireless device are to transition from the power saving state to the active state.

In some embodiments, the link wakeup indication message is transmitted to the wireless device via a unicast frame, wherein a multi-link indication field of the unicast frame includes a bit indicative of whether to transition the wireless device between the power saving state and the active state.

In some embodiments, the method includes receiving, by the network node, a primary link request message from the wireless device that identifies the first link to be included as the primary link and includes link configuration information. The method may also include transmitting, by the network node, a primary link response message to the wireless device confirming the first link as the primary link. The method may also include receiving, by the network node, a primary link acknowledgment message indicating that the first link has been established as the primary link.

In some embodiments, the primary link request message identifies that the primary link is to be transitioned from a previous link to the first link.

In another exemplary embodiment, a method for wireless communication comprises receiving, by a wireless device, a link wakeup indication message from a network node over a primary link of multiple links between the network node and the wireless device. The method may also include transitioning, by the wireless device, at least one link of the multiple links from a power saving state to an active state based on receiving the link wakeup indication message from the network node. The method may also include transmitting, by the wireless device, a link wakeup notification message to the network node indicating that the at least one link of the multiple links has been transitioned from the power saving state to the active state.

In some embodiments, the method includes, responsive to transmitting the link wakeup notification message, receiving, by the wireless device, data from the network node over at least one of the multiple links between the network node and the wireless device.

In some embodiments, transitioning from the power saving state to the active state includes enabling, by the wireless device, the at least one link of the multiple links to receive data from the network node, wherein the power saving state enables only the primary link.

In some embodiments, a multi-link transmission opportunity is established for multi-link transmissions between the network node and the wireless device during the multi-link transmission opportunity.

In some embodiments, the method includes, responsive to determining that the data has been received, transmitting, by the wireless device, a multi-link acknowledgement message to the network node indicating that the data has been successfully received from the network node over the multiple links.

In some embodiments, the data transmitted by the network node is sent by a first set of radio stations internal to the network node and a second set of radio stations external to the network node, wherein the first set of radio stations and the second set of radio stations are controlled by a logical entity of the network node.

In some embodiments, the link wakeup indication message is included in an information element of a management frame.

In some embodiments, the link wakeup indication message is included in a beacon frame.

In some embodiments, the link wakeup indication message incudes a multi-link indication field including a bitmap indicative of the multiple links between the network node and the wireless device.

In some embodiments, the wireless device is configured to transition from the power saving state to the active state based on determining that the bitmap of the multi-link indication field indicates that the multiple links between the network node and wireless device are to transition from the power saving state to the active state.

In some embodiments, the link wakeup notification message is transmitted to the wireless device via a unicast frame, wherein a multi-link indication field of the unicast frame includes a bit indicative of whether to transition the wireless device between the power saving state and the active state.

In some embodiments, the method includes transmitting, by the wireless device, a primary link request message to the network node that identifies a first link to be included as the primary link and includes link configuration information. The method may also include receiving, by the wireless device, a primary link response message from the network node confirming the first link as the primary link. The method may also include transmitting, by the wireless device, a primary link acknowledgment message to the network node indicating that the first link has been established as the primary link.

In some embodiments, the primary link request message identifies that the primary link is to be transitioned from a previous link to the first link.

Wireless Communication System

Figure 9:
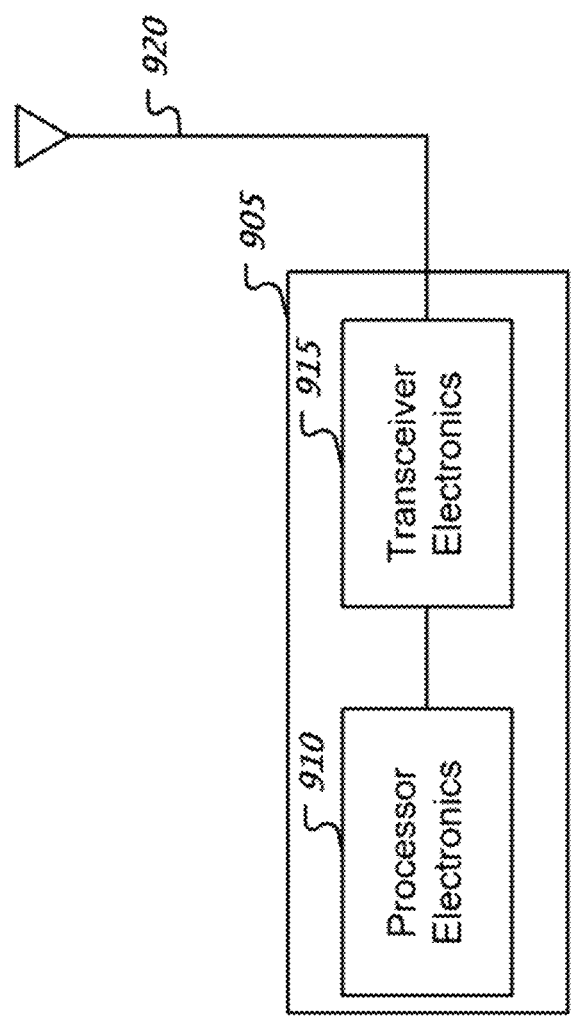
FIG. 9 is a block diagram representation of a portion of a hardware platform.

FIG. 9 is a block diagram representation of a portion of a hardware platform. The communication node as described in the present application may include the hardware platform as described with respect to FIG. 9. A hardware platform 905 such as a network device or a base station or a wireless device (or UE) can include processor electronics 910 such as a microprocessor that implements one or more of the techniques presented in this document. The hardware platform 905 can include transceiver electronics 915 to send and/or receive wired or wireless signals over one or more communication interfaces such as antenna 920 or a wireline interface. The hardware platform 905 can implement other communication interfaces with defined protocols for transmitting and receiving data. The hardware platform 905 can include one or more memories (not explicitly shown) configured to store information such as data and/or instructions. In some implementations, the processor electronics 910 can include at least a portion of the transceiver electronics 915. In some embodiments, at least some of the disclosed techniques, modules or functions and network nodes are implemented using the hardware platform 905.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, which is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
   transmitting, by a network node, a link wakeup indication message to a wireless device over a first link of multiple links between the network node and the wireless device, the link wakeup indication message indicating a request to transition at least one link of the multiple links between an active state and a power saving state,
      wherein the link wakeup indication message is transmitted to the wireless device via a frame that includes a first field that includes a set of bits that indicate whether to transition the wireless device and another wireless device between the power saving state and the active state,
      wherein the frame includes a second field and a third field that respectively indicates whether to wake up the wireless device and the another wireless device,
      wherein the set of bits includes a first bit associated with the wireless device and corresponding to the second field, and
   wherein the set of bits includes a second bit associated with the another wireless device and corresponding to the third field; and
   responsive to the transmitting the link wakeup indication message, obtaining, by the network node, a link wakeup notification message from the wireless device indicating that at least one link of the multiple links has transitioned between the active state and the power saving state.

2. The method of claim 1, further comprising:
   responsive to the obtaining the link wakeup notification message from the wireless device, establishing, by the network node, a multi-link transmission opportunity for multilink data transmission between the network node and the wireless device during the multi-link transmission opportunity.

3. The method of claim 1, wherein the link wakeup indication message is transmitted over a primary link, and wherein data is sent to the wireless device over both the primary link and at least one secondary link.

4. The method of claim 1, wherein the power saving state enables only a primary link, and the active state enables both the primary link and at least one secondary link of the multiple links.

5. A method for wireless communication, comprising:
   receiving, by a wireless device, a link wakeup indication message from a network node over a primary link of multiple links between the network node and the wireless device,
      wherein the link wakeup indication message is received by the wireless device via a frame that includes a first field that includes a set of bits that indicate whether to transition the wireless device and another wireless device between a power saving state and an active state,
      wherein the frame includes a second field and a third field that respectively indicates whether to wake up the wireless device and the another wireless device,
      wherein the set of bits includes a first bit associated with the wireless device and corresponding to the second field, and
   wherein the set of bits includes a second bit associated with the another wireless device and corresponding to the third field;
   transitioning, by the wireless device, at least one link of the multiple links from the power saving state to the active state based on receiving the link wakeup indication message from the network node; and
   transmitting, by the wireless device, a link wakeup notification message to the network node indicating that the at least one link of the multiple links has been transitioned from the power saving state to the active state.

6. The method of claim 5, further comprising:
   responsive to obtaining the link wakeup notification message from the wireless device, transmitting, by the network node, data to the wireless device over two or more of the multiple links between the network node and the wireless device.

7. The method of claim 5, wherein transitioning from the power saving state to the active state includes:
   enabling, by the wireless device, the at least one link of the multiple links to receive data from the network node, wherein the power saving state enables only the primary link.

8. The method of claim 5, wherein a multi-link transmission opportunity is established for multilink transmissions between the network node and the wireless device during the multi-link transmission opportunity.

9. The method of claim 5, wherein the link wakeup indication message is received by the wireless device via a unicast frame, wherein a multi-link indication field of the unicast frame includes a bit indicative of whether to transition the wireless device between the power saving state and the active state.

10. A network node for wireless communication comprising a processor that is configured to carry out a method, comprising:
   transmit a link wakeup indication message to a wireless device over a first link of multiple links between the network node and the wireless device, the link wakeup indication message indicating a request to transition at least one link of the multiple links between an active state and a power saving state,
      wherein the link wakeup indication message is transmitted to the wireless device via a frame that includes a first field that includes a set of bits that indicate whether to transition the wireless device and another wireless device between the power saving state and the active state,
wherein the frame includes a second field and a third field that respectively indicates whether to wake up the wireless device and the another wireless device,
wherein the set of bits includes a first bit associated with the wireless device and corresponding to the second field, and
wherein the set of bits includes a second bit associated with the another wireless device and corresponding to the third field; and
responsive to the transmit the link wakeup indication message, obtain, by the network node, a link wakeup notification message from the wireless device indicating that at least one link of the multiple links has transitioned between the active state and the power saving state.

11. The network node of claim 10, wherein the processor is further configured to:
responsive to the obtain the link wakeup notification message from the wireless device, establish, by the network node, a multi-link transmission opportunity for multilink data transmission between the network node and the wireless device during the multi-link transmission opportunity.

12. The network node of claim 10, wherein the link wakeup indication message is transmitted over a primary link, and wherein data is sent to the wireless device over both the primary link and at least one secondary link.

13. The network node of claim 10, wherein the power saving state enables only a primary link, and the active state enables both the primary link and at least one secondary link of the multiple links.

14. A wireless device for wireless communication comprising a processor that is configured to carry out a method, comprising:
receive a link wakeup indication message from a network node over a primary link of multiple links between the network node and the wireless device,
wherein the link wakeup indication message is received by the wireless device via a frame that includes a first field that includes a set of bits that indicate whether to transition the wireless device and another wireless device between a power saving state and a active state,
wherein the frame includes a second field and a third field that respectively indicates whether to wake up the wireless device and the another wireless device,
wherein the set of bits includes a first bit associated with the wireless device and corresponding to the second field, and
wherein the set of bits includes a second bit associated with the another wireless device and corresponding to the third field;
transition, by the wireless device, at least one link of the multiple links from the power saving state to the active state based on receiving the link wakeup indication message from the network node; and
transmit, by the wireless device, a link wakeup notification message to the network node indicating that the at least one link of the multiple links has been transitioned from the power saving state to the active state.

15. The wireless device of claim 14, wherein the processor is further configured to:
responsive to obtaining the link wakeup notification message from the wireless device, transmitting, by the network node, data to the wireless device over two or more of the multiple links between the network node and the wireless device.

16. The wireless device of claim 14, wherein transitioning from the power saving state to the active state includes:
enabling, by the wireless device, the at least one link of the multiple links to receive data from the network node, wherein the power saving state enables only the primary link.

17. The wireless device of claim 14, wherein a multi-link transmission opportunity is established for multilink transmissions between the network node and the wireless device during the multi-link transmission opportunity.

18. The wireless device of claim 14, wherein the link wakeup indication message is received by the wireless device via a unicast frame, wherein a multi-link indication field of the unicast frame includes a bit indicative of whether to transition the wireless device between the power saving state and the active state.

\* \* \* \* \*